United States Patent [19]

Harris

[11] 4,443,850

[45] Apr. 17, 1984

[54] INTERFACE CIRCUIT FOR SUBSYSTEM CONTROLLER

[75] Inventor: Craig W. Harris, El Toro, Calif.

[73] Assignee: Burroughs Corporation, Detroit, Mich.

[21] Appl. No.: 326,423

[22] Filed: Dec. 1, 1981

[51] Int. Cl.³ .................. G06F 15/16; G06F 15/20
[52] U.S. Cl. ............................................. 364/200
[58] Field of Search ........................ 364/200 MS File

[56] References Cited

U.S. PATENT DOCUMENTS

| | | | |
|---|---|---|---|
| 3,530,438 | 9/1970 | Mellen et al. | 364/200 |
| 3,787,673 | 1/1974 | Watson et al. | 364/200 |
| 4,091,455 | 5/1978 | Woods et al. | 364/200 |
| 4,280,193 | 7/1981 | Baun et al. | 364/900 |

*Primary Examiner*—Harvey E. Springborn
*Attorney, Agent, or Firm*—Alfred W. Kozak; Nathan Cass; Kevin R. Peterson

[57] ABSTRACT

An interface circuit for a subsystem-controller is used in a data communications network. The interface circuit has a first (DLI) data link interface logic unit which includes a PROM sequencer which, when initiated by a master processor in the subsystem, acts to transfer data between a main host computer and a shared memory unit in the subsystem-controller. The interface circuit further includes a second (MLI) message level interface logic unit which is controlled by a slave processor (NDL) through the master (MLI) processor and functions to edit, translate and manage protocols for data transferred to and from a selected line communications processor which services a plurality of remote terminals.

10 Claims, 20 Drawing Figures

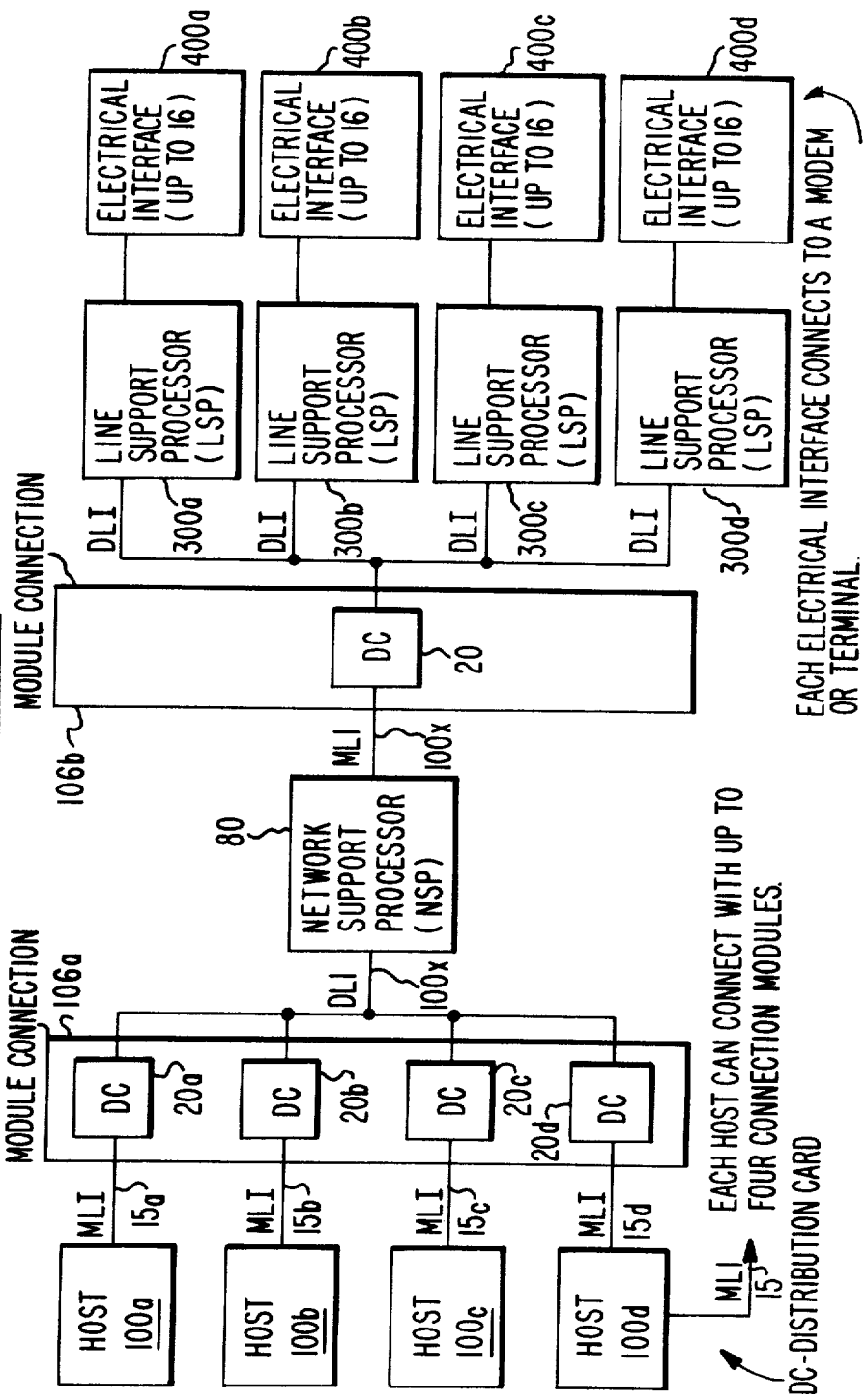
FIG. 1A. Data Communications Network.

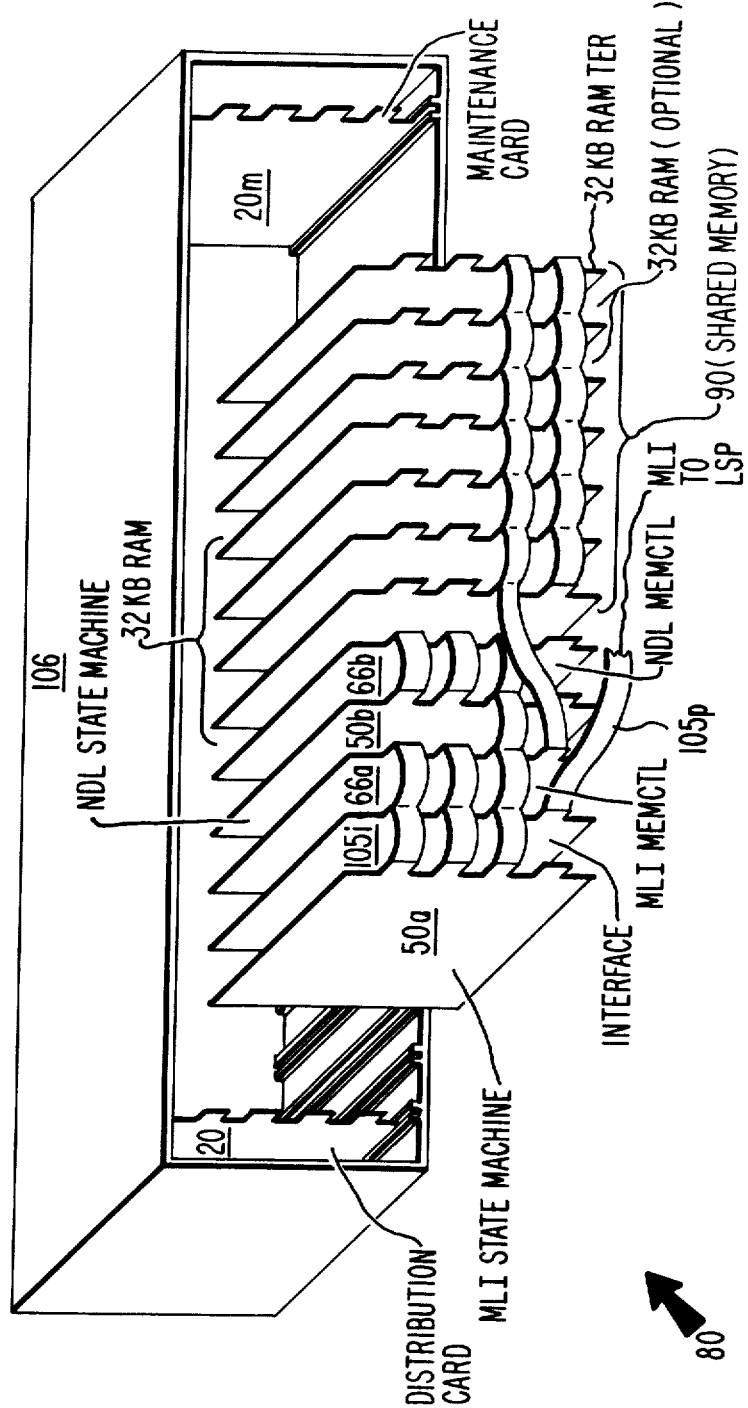
FIG. 1B. Network Support Processor.

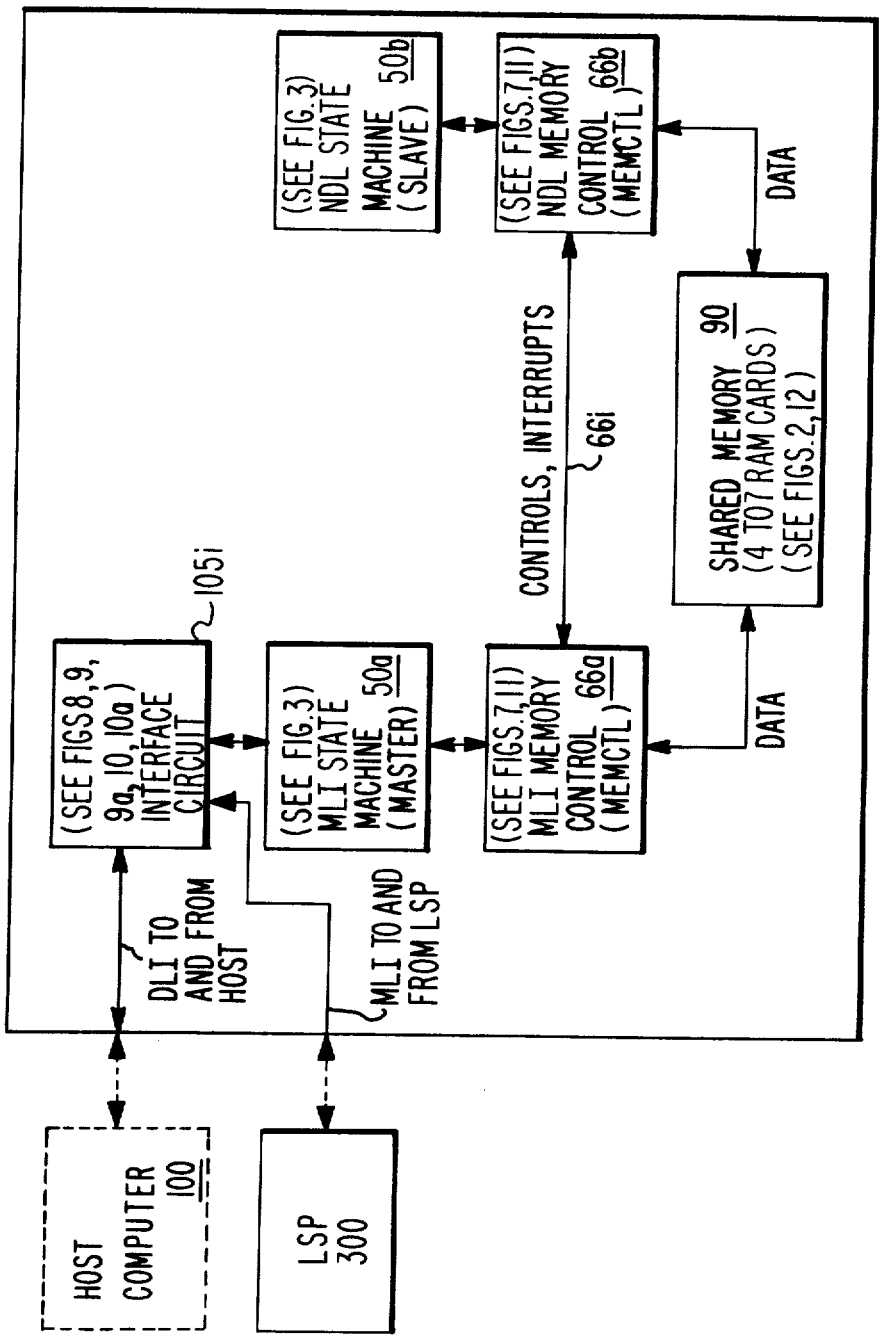
FIG. 2. NSP Card Level Block Diagram.

FIG. 3. <u>State Machine Processor & Adjacent Units.</u>
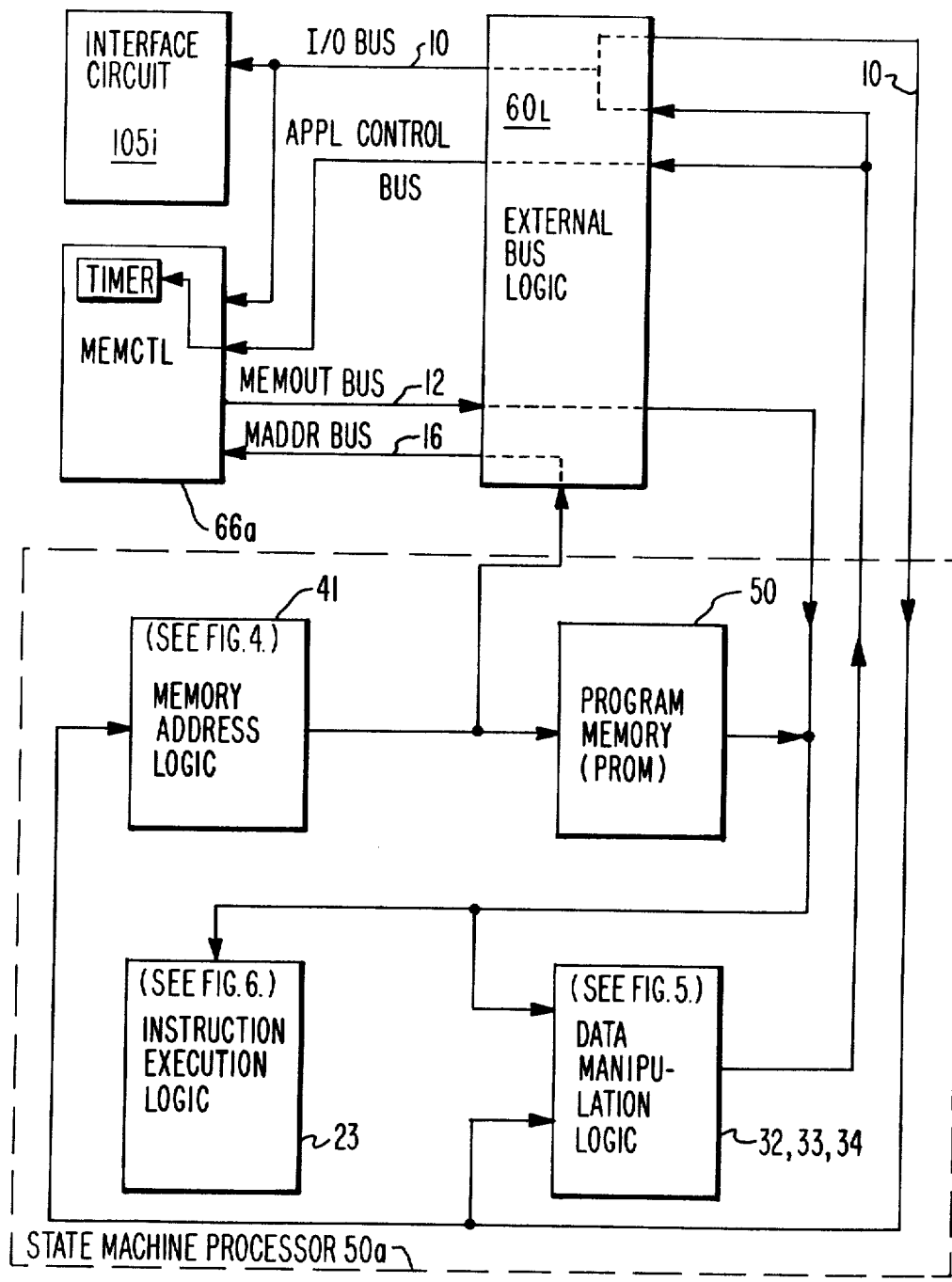

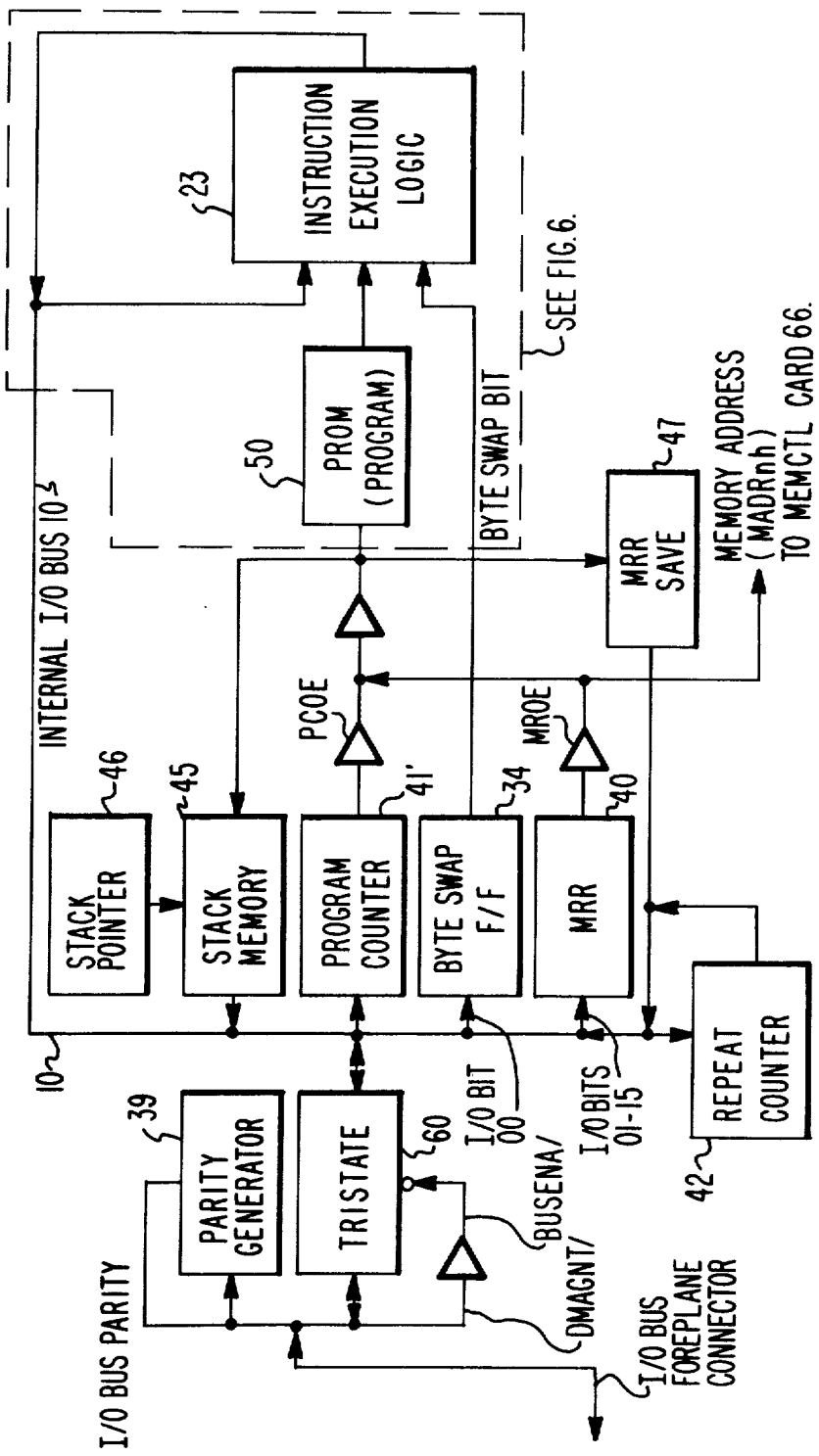
FIG. 4. Memory Addressing Logic Diagram (1 of Fig. 3.)

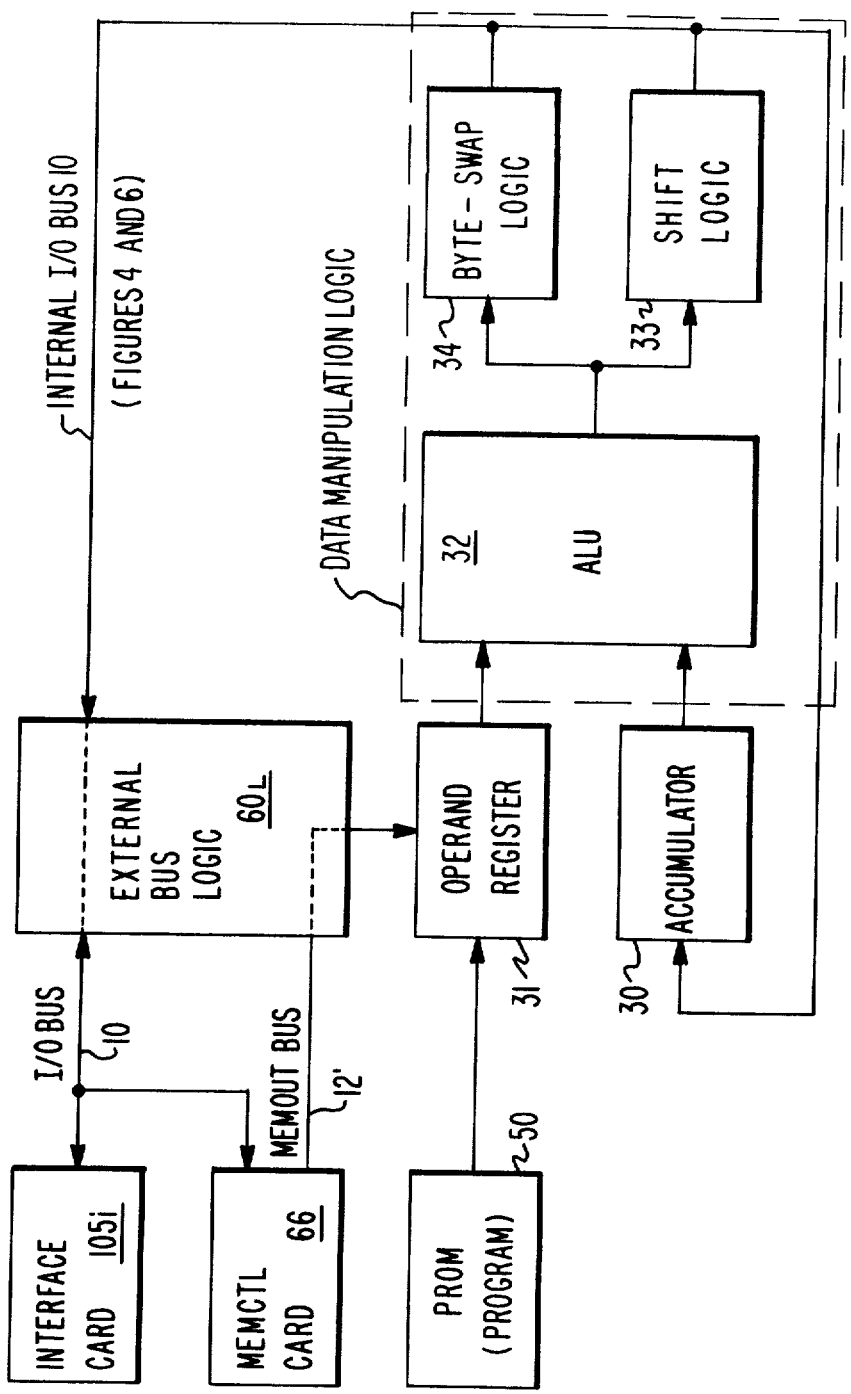
FIG. 5. Data Manipulation Logic 1 of Fig. 3.1 and Adjacent Connections.

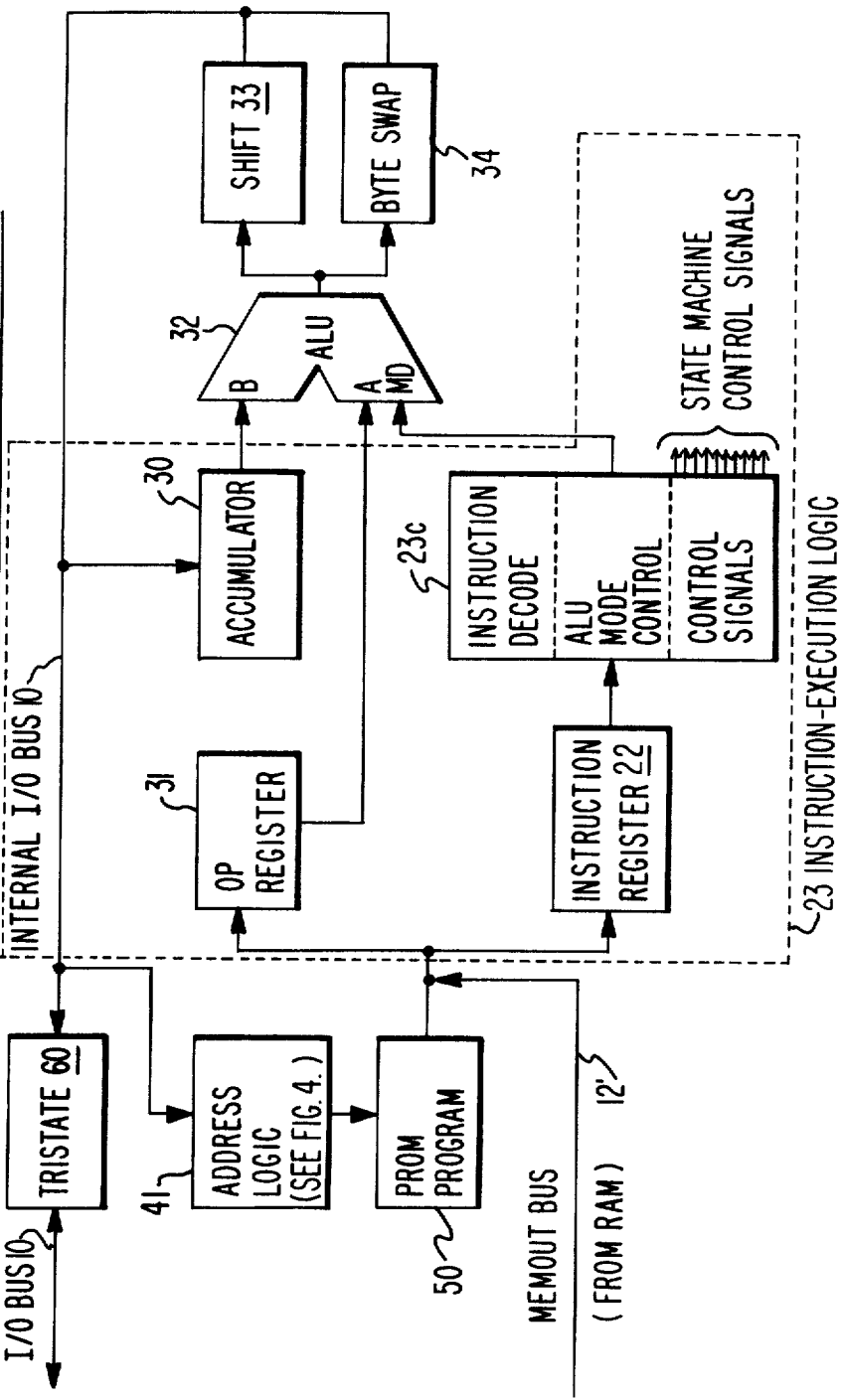
FIG.6. Instruction Execution Logic and Adjacent Connections.

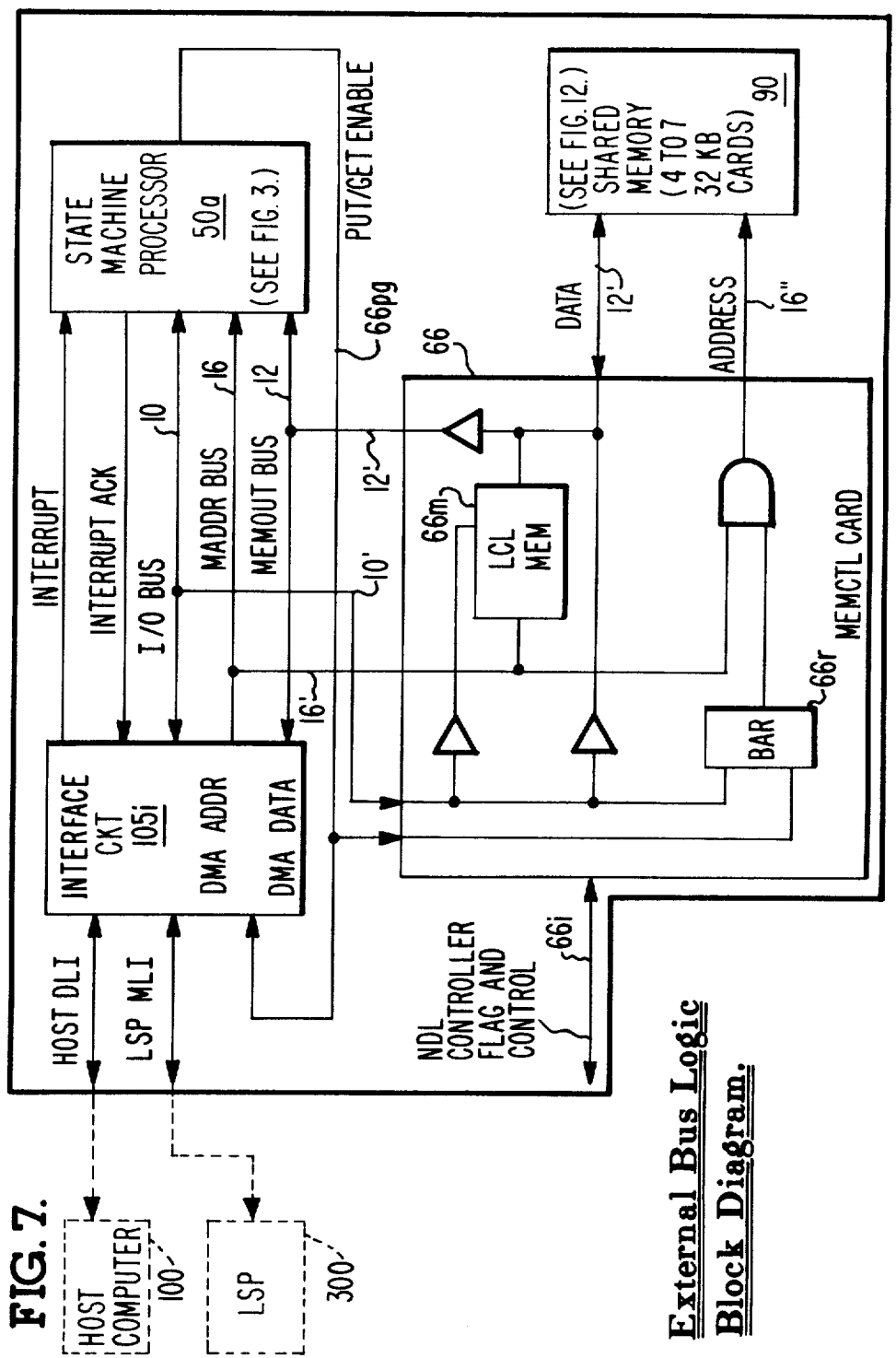

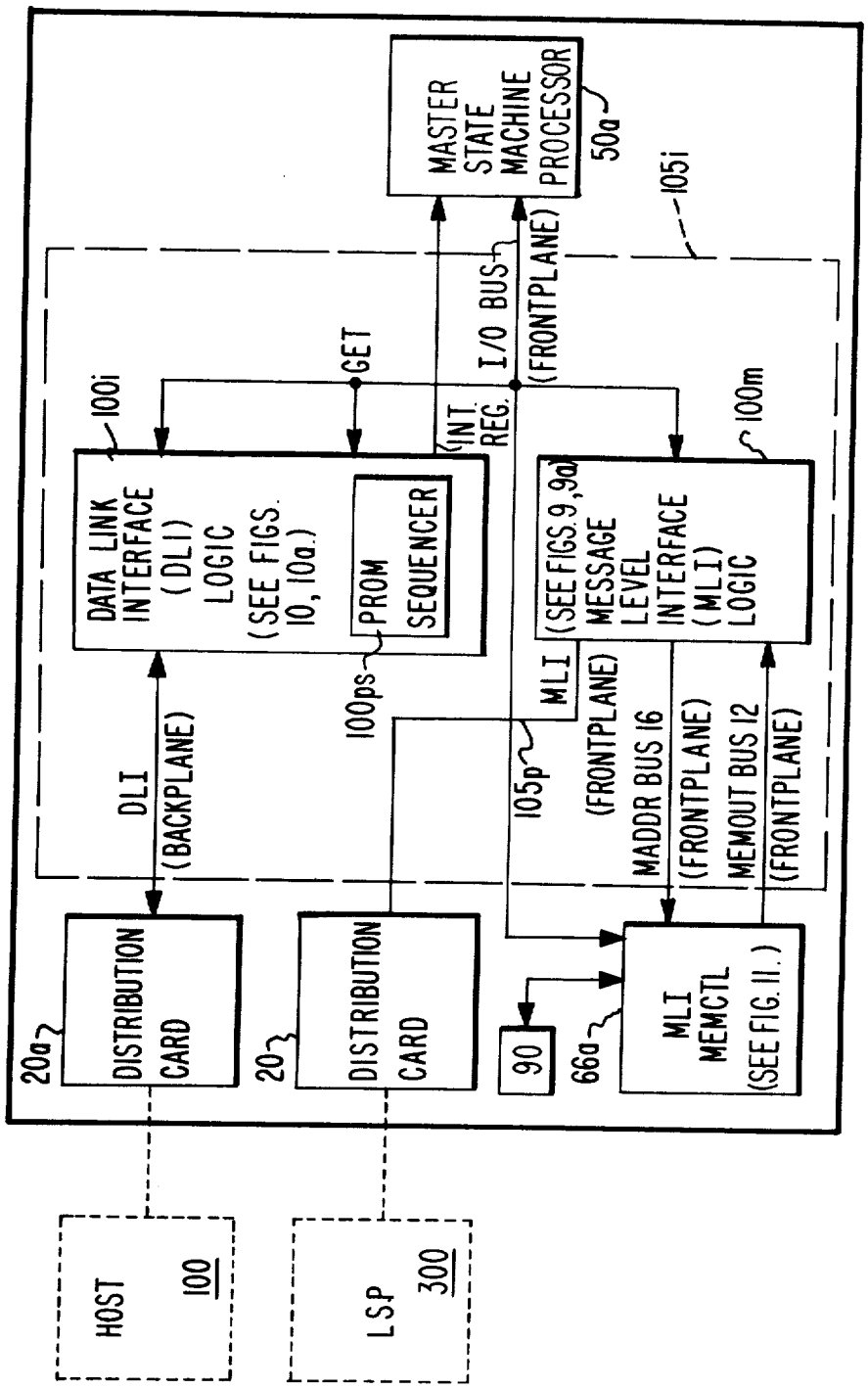
FIG. 8. Interface Card 105i1 Block Diagram

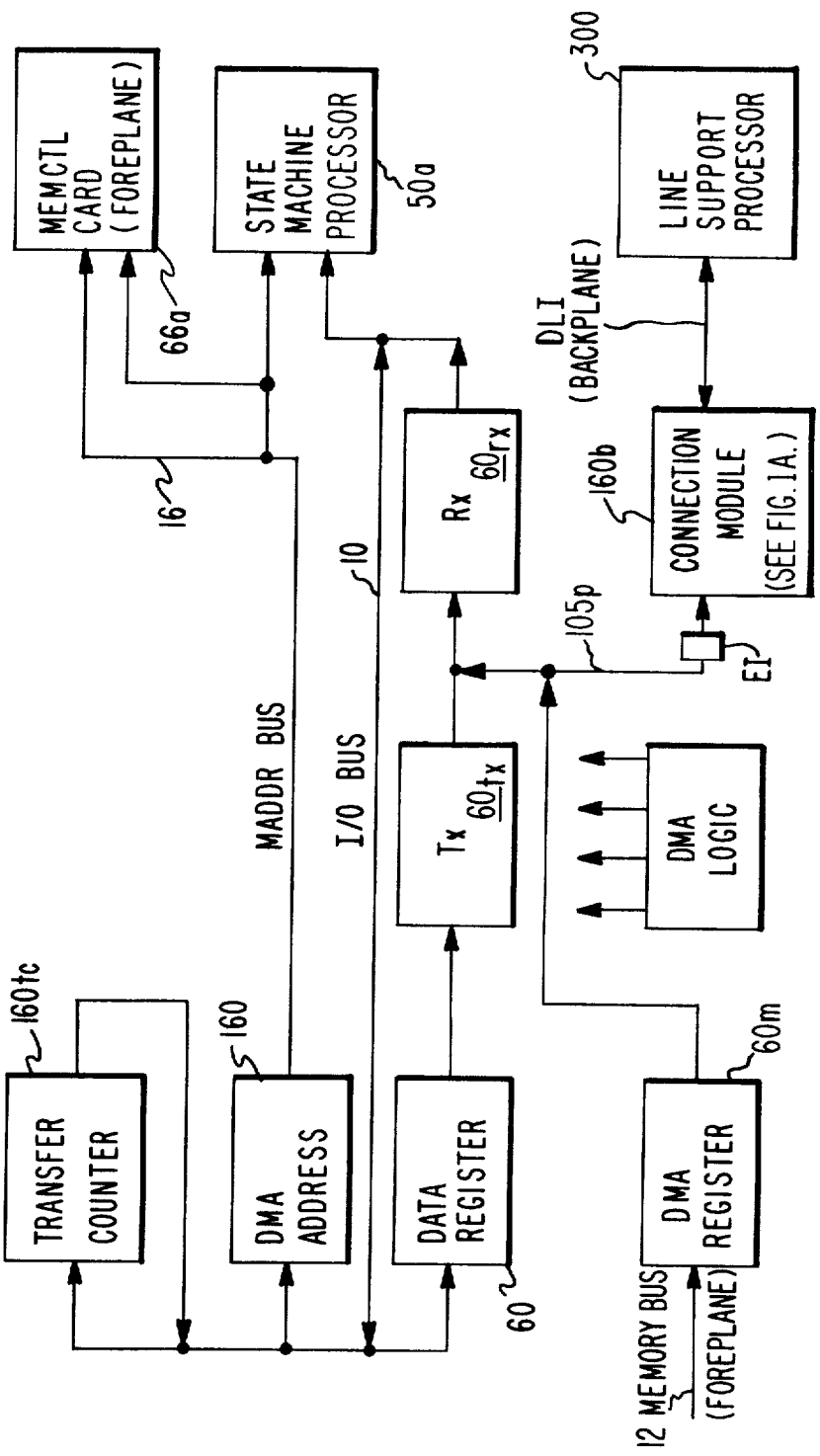
FIG. 9. MLI Interface Logic Diagram (100m)

FIG. 9A. MLI Interface Logic Primary Data Paths.
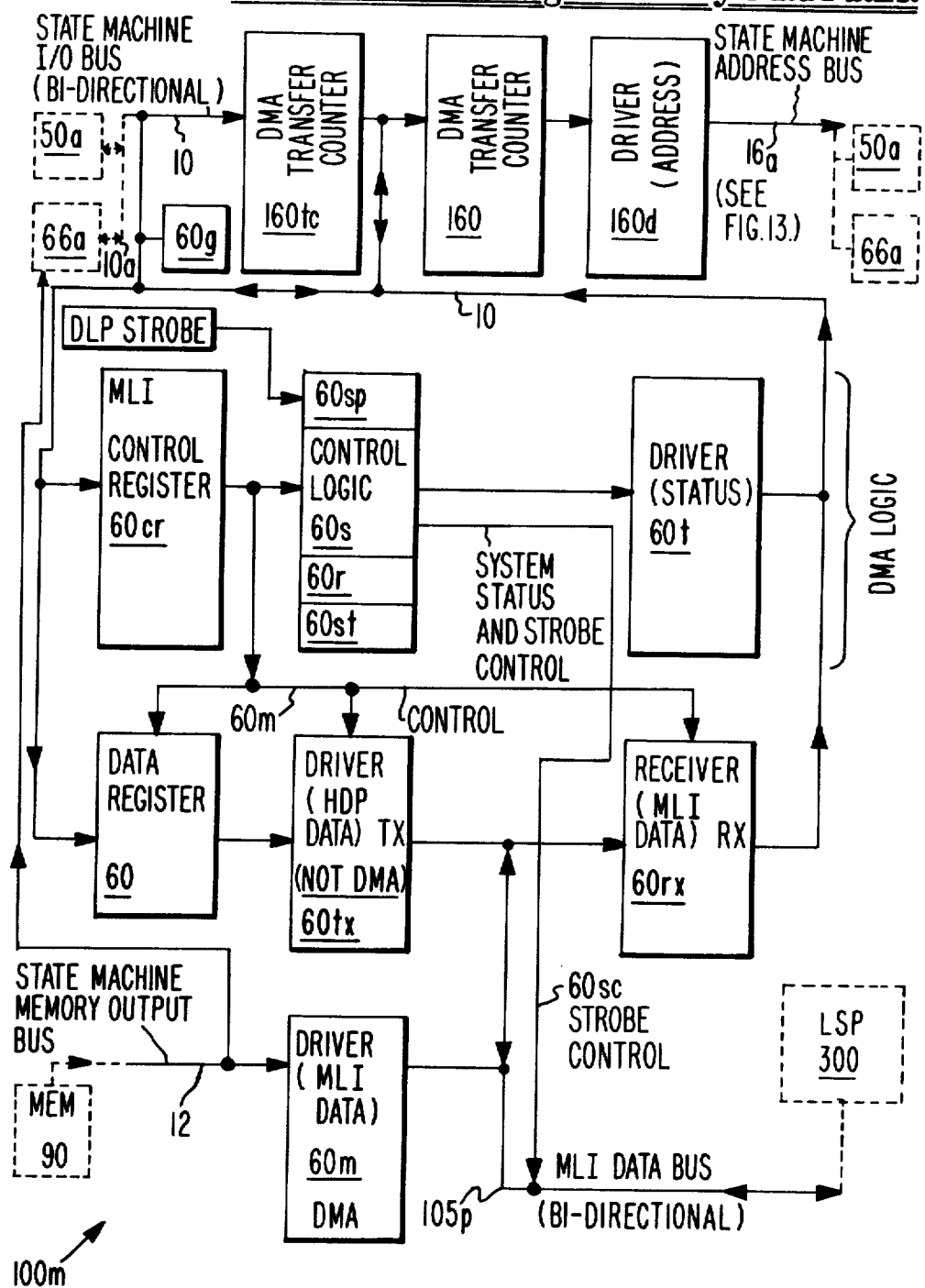

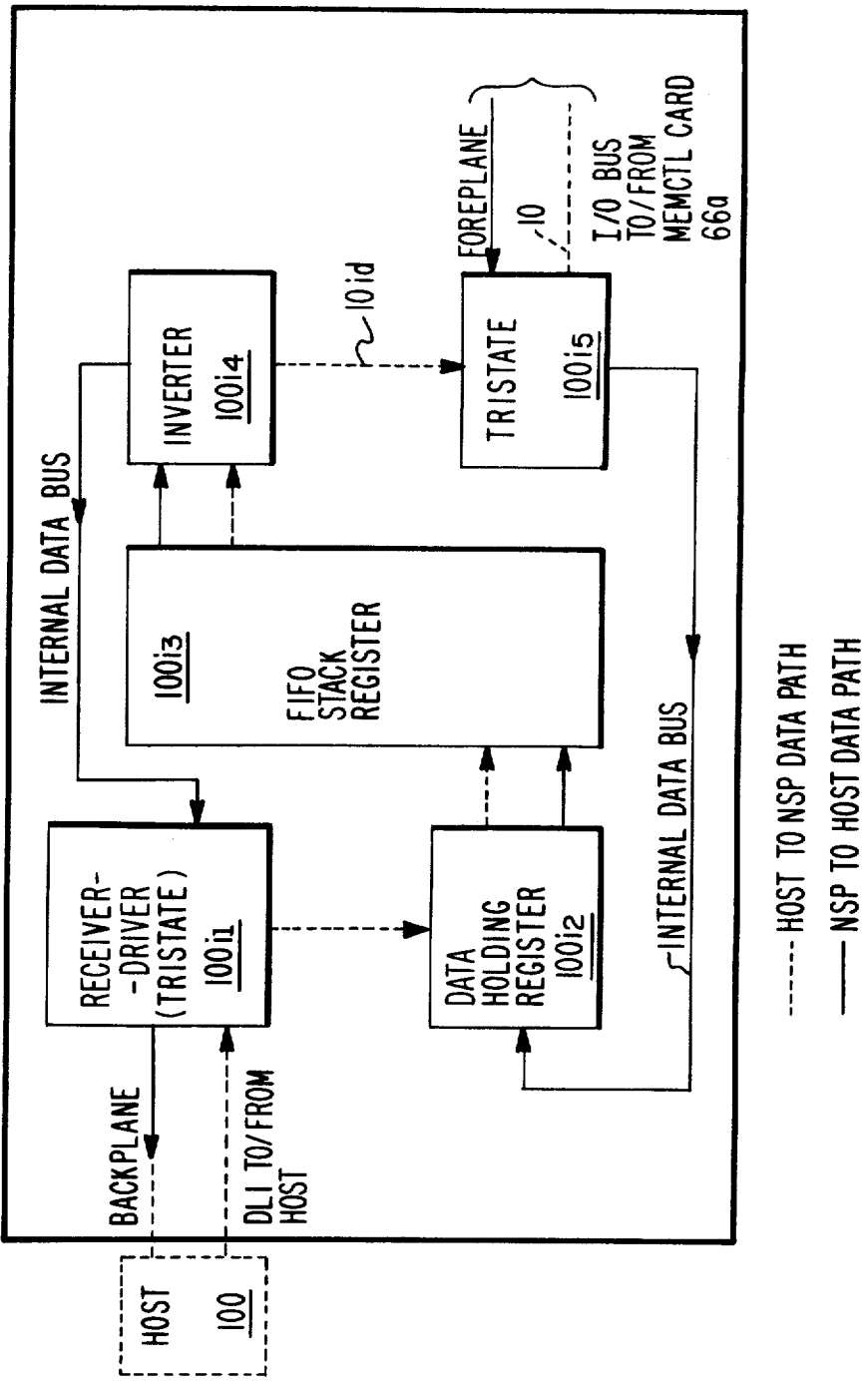
FIG. 10. *DLI Block Diagram (100i1) Data Path.*

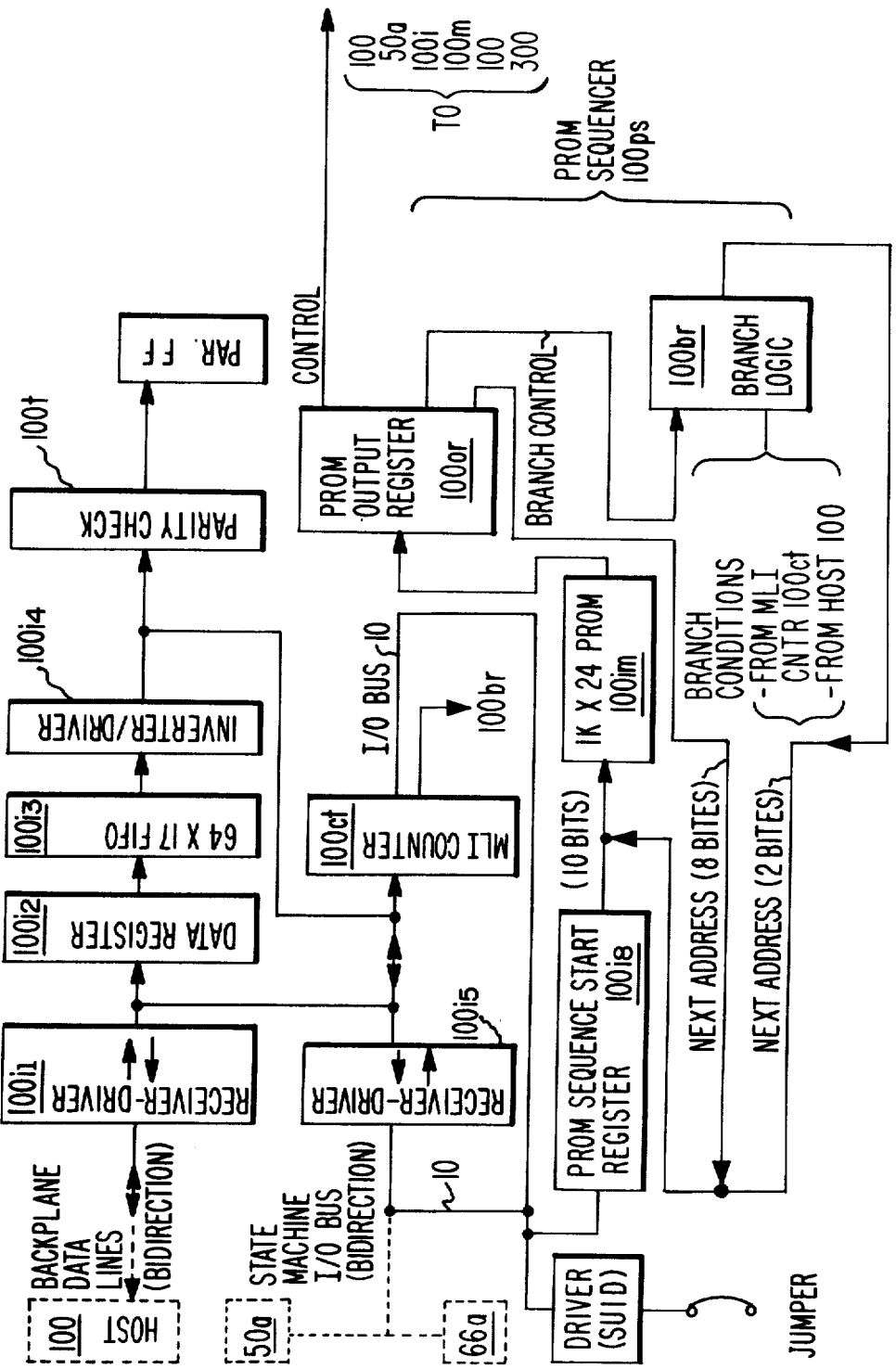
FIG. 10A. DLI Interface Primary Data Paths.

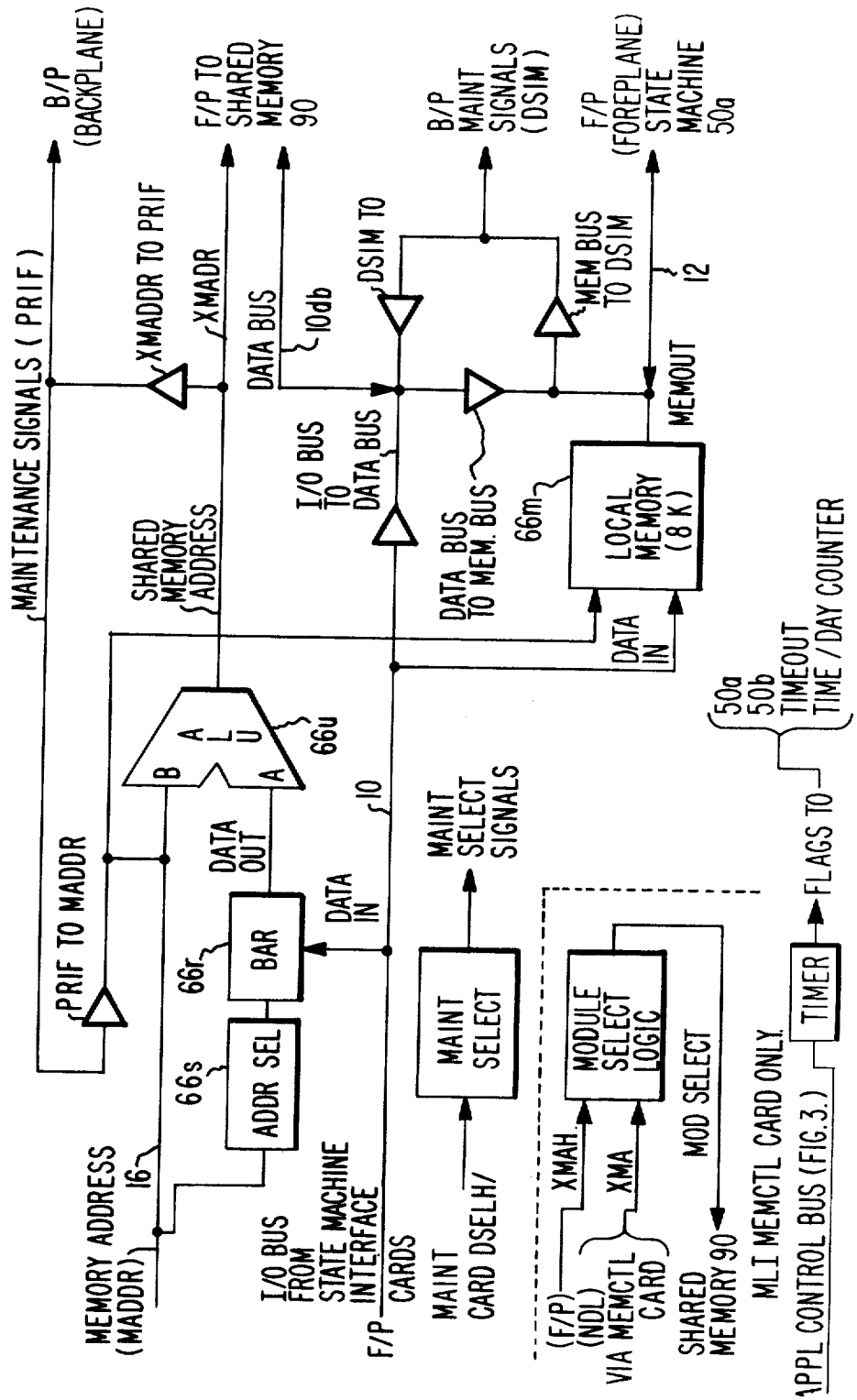
FIG.11. MEMCTL Block Diagram.

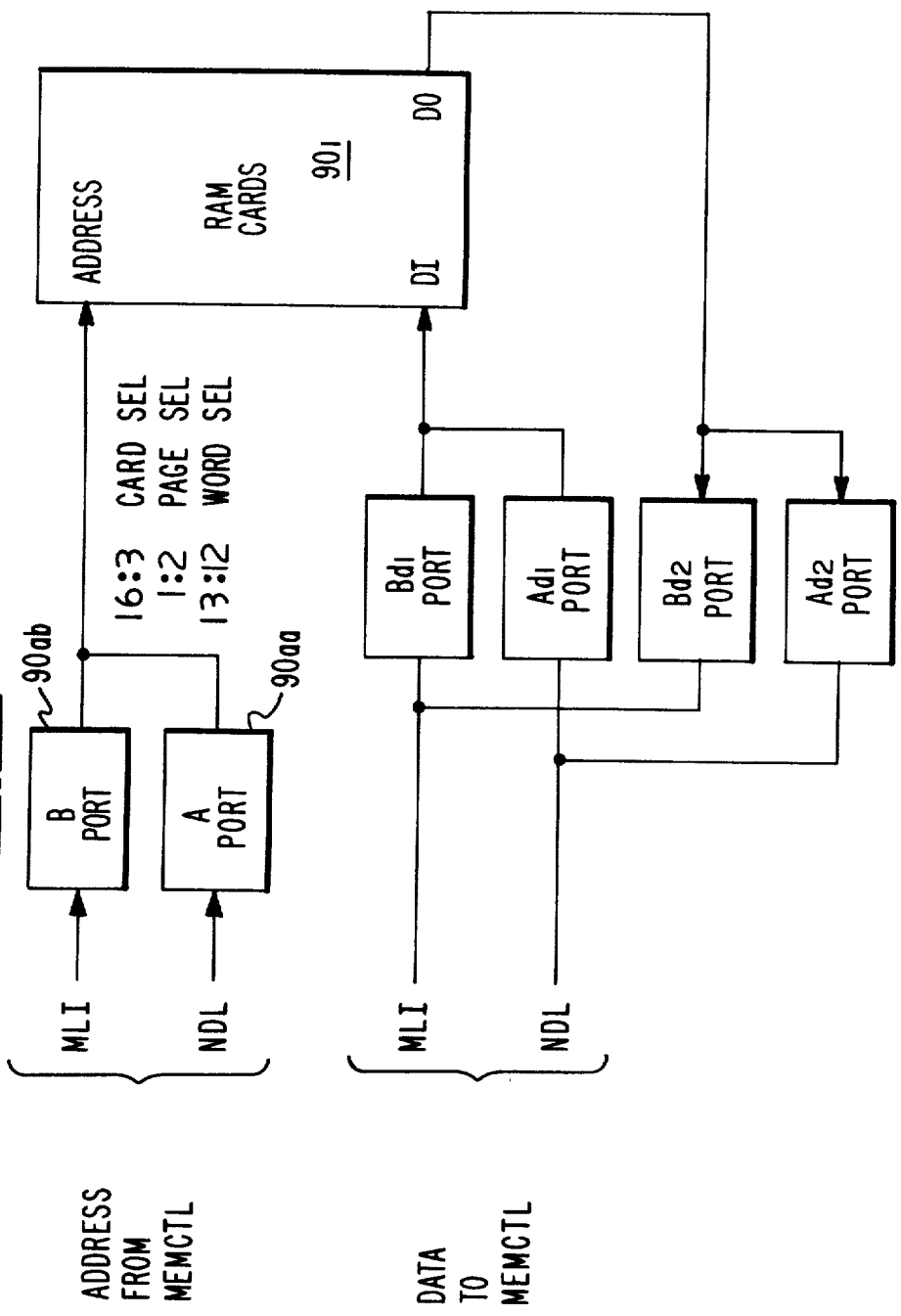
FIG. 12. *32 KB Ram Block Diagram.*

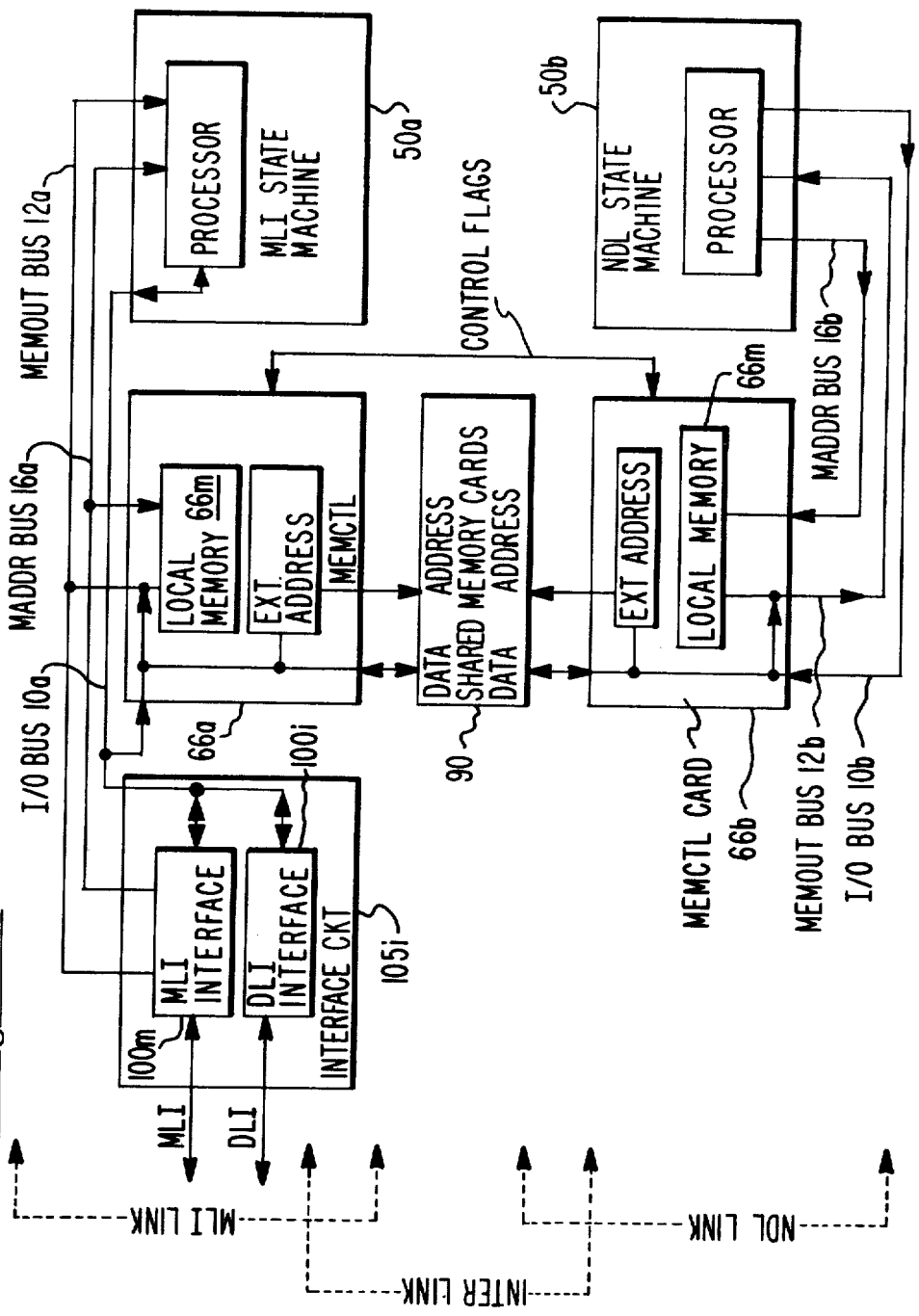
FIG.13. NSP Integration.

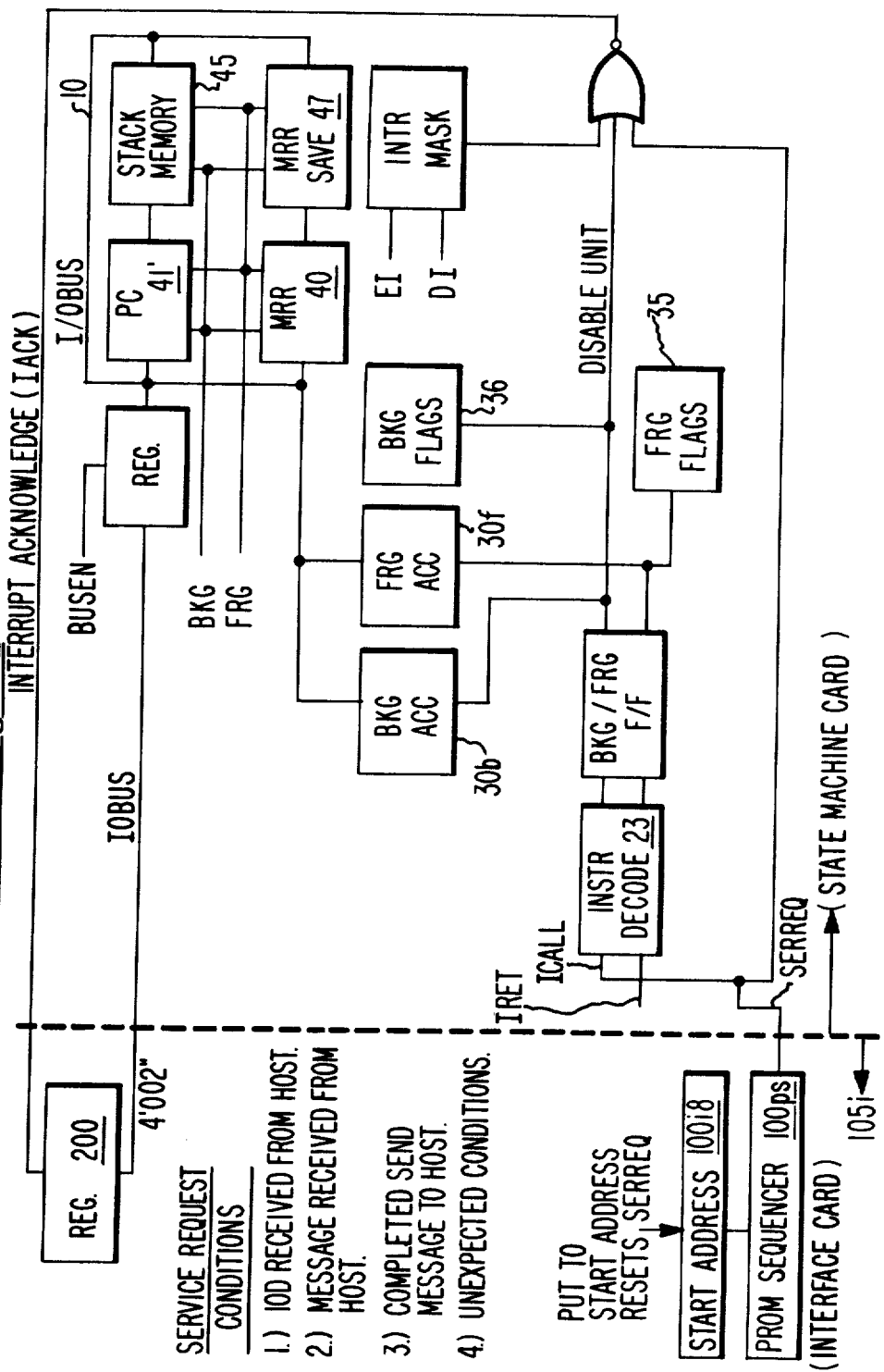
FIG.14. Interrupt Logic Block Diagram.

FIG.15. <u>Memory Locations.</u>
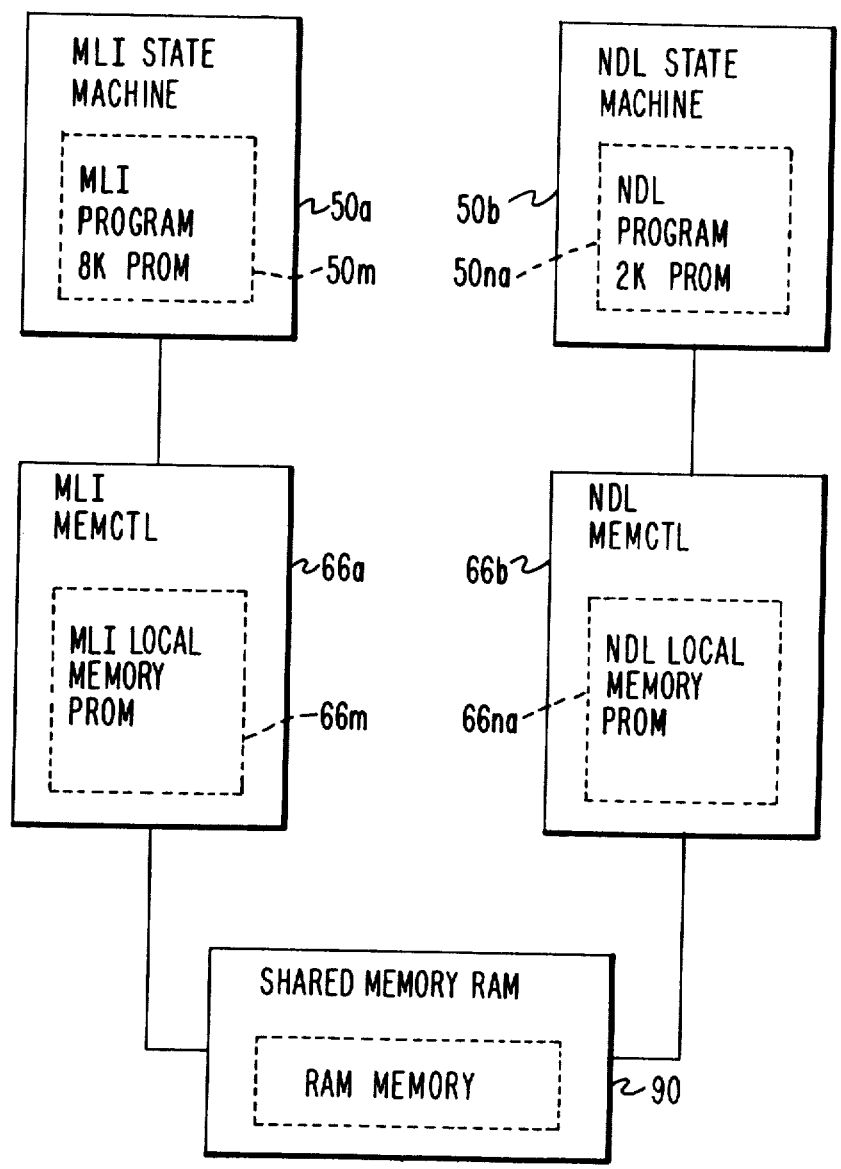

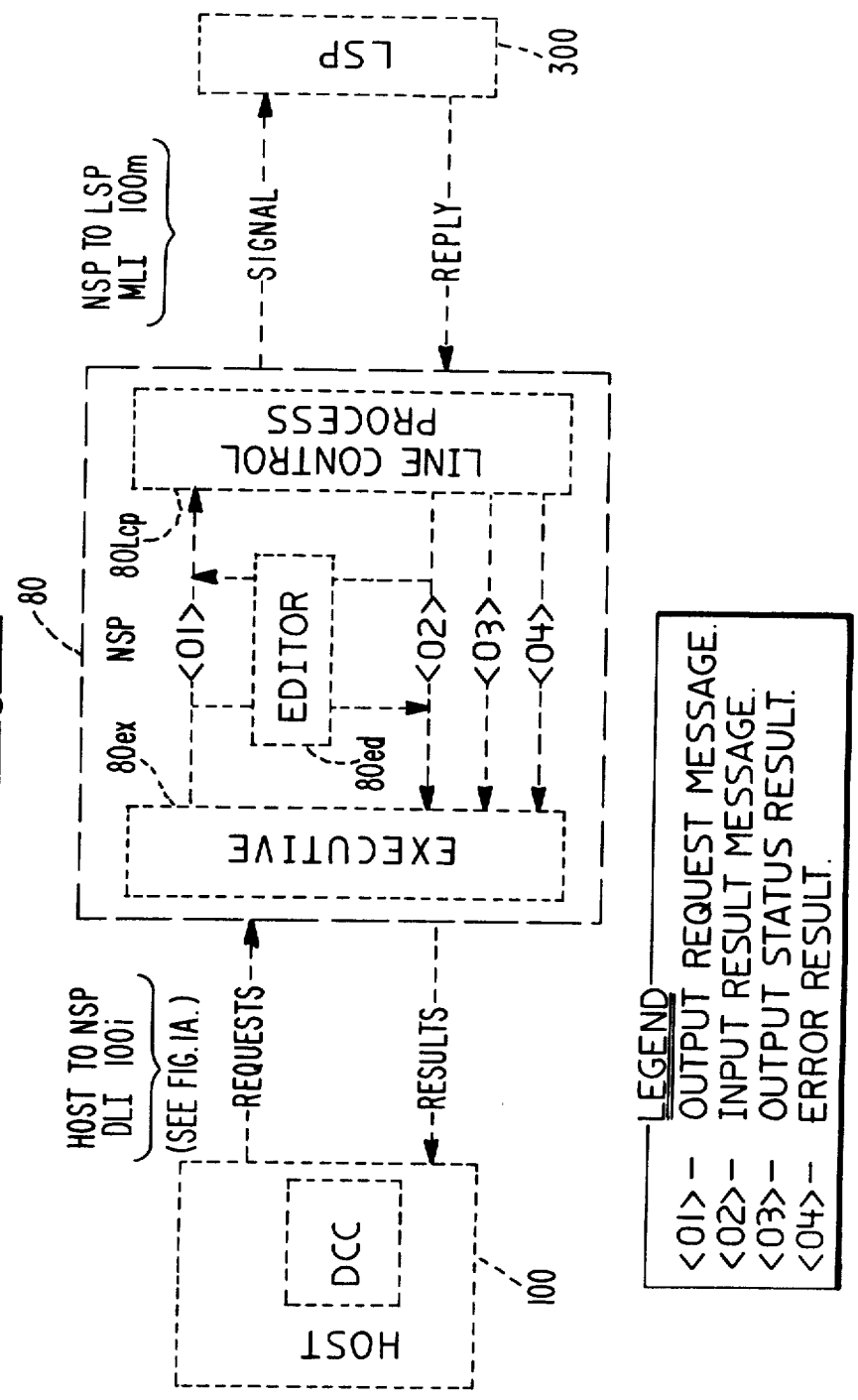
FIG. 16. *Message Transfer Block Diagram.*

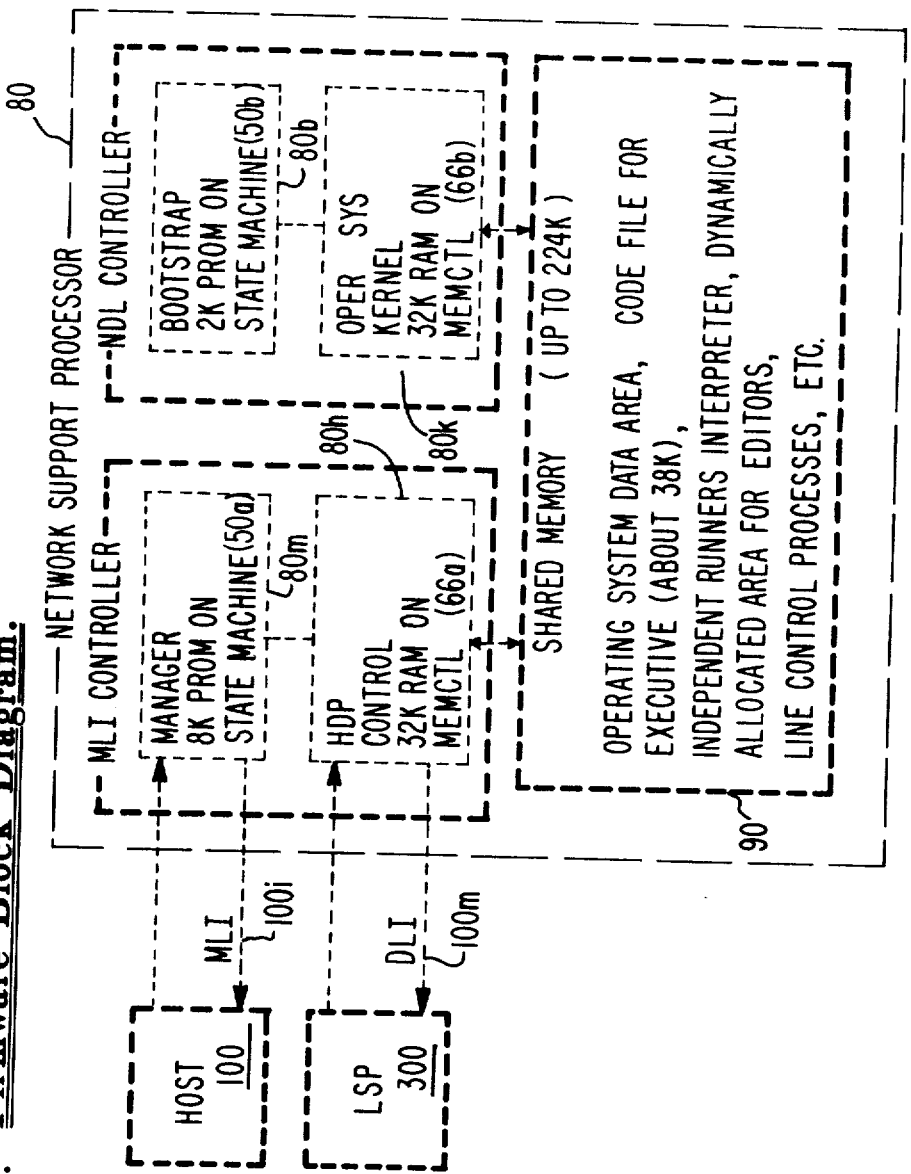
FIG. 17. *Firmware Block Diagram.*

INTERFACE CIRCUIT FOR SUBSYSTEM CONTROLLER

FIELD OF THE INVENTION

This invention relates to an Interface Circuit which constitutes part of a subsystem-controller whereby a plurality of host computers can transfer data to/from data-communication terminals.

CROSS REFERENCE TO RELATED APPLICATIONS AND PATENTS

This application is technically related to a number of patent applications and priorly issued patents. The related patent applications include:

"Memory Control Circuit for Subsystem Controller", inventor Ronald Mathews, filed Aug. 24, 1981, Ser. No. 295,588;

"Data Communications Network", inventors Robert Catiller, Craig Harris and Robert Mathews, filed Aug. 24, 1981, Ser. No. 295,587;

"Subsystem Controller", inventor Robert Catiller, filed Aug. 24, 1981, U.S. Ser. No. 295,586.

"Direct Memory Access Logic System For A Data Transfer Network", inventor Craig Harris, filed Dec. 1, 1981, Ser. No. 326,335.

The following issued patents which involve the use of an Input/Output Subsystem connecting a main host computer with remote terminal units provide a background to the development of the present disclosure:

U.S. Pat. No. 4,162,520, entitled "Intelligent Input-/Output Interface Control Unit for Input/Output Subsystem", inventors Darwin Cook and Donald Millers II. This case described the peripheral-controller known as a Line Control Processor which controls and handles data transfers between a given peripheral terminal unit and a main host system.

U.S. Pat. No. 4,074,352, entitled "Modular Block Unit for I/O Subsystem", inventors Darwin Cook and Donald Millers II. This case described a Base Module unit which housed and supported a group of eight peripheral-controllers and interfaced them to a main host computer system.

U.S. Pat. No. 4,106,092, entitled "Interface System Providing Interfaces to Central Processing Unit and Modular Processor Controllers for I/O Subsystem", inventor Donald Millers II. This patent describes the unit in the main host system, designated as an I/O Translator or "IOT" which controls and regulates data transfer between the main host system and a plurality of base modules and their peripheral controllers.

U.S. Pat. No. 4,189,769, entitled "Input/Output Subsystem for Digital Data Processor System", inventors Darwin Cook and Donald Millers II. This case describes a subsystem wherein a plurality of peripheral-controllers (called Line Control Processors) are organized in base modules for data communication with a main host system. The peripheral-controllers and the base modules form an input/output subsystem for controlling data transfers to/from a large number of peripheral units to the main host computer system.

U.S. Pat. No. 4,280,193, entitled "Data Link Processor for Magnetic Tape Data Transfer System", inventors Kenneth W. Baun, Jimmy G. Saunders. This patent describes an improved peripheral-controller called a Data Link Processor which handles data transfers between a main host computer and remote magnetic tape peripheral units.

The following five listed patents described the use and operation of a unit called a "universal input-output state machine processor" which is used in the present disclosure, and these listed patents are incorporated by reference as being informative on the circuits and functional details of the units hereinafter called the "message level interface (MLI) state machine" master processor and also the network definition language (NDL) state machine "slave" processor.

U.S. Pat. No. 4,290,106, entitled "Microprocessor System With Source Address Selection", inventors Robert Catiller and Brian Forbes, issued Sept. 15, 1981.

U.S. Pat. No. 4,291,372, entitled "Microprocessor System With Specialized Instruction Format", inventors Robert Catiller and Brian Forbes, issued Sept. 22, 1981.

U.S. Pat. No. 4,313,162, entitled "I/O Subsystem Using Data Link Processors", inventors Kenneth W. Baun and Donald A. Millers, II, issued Jan. 26, 1982.

U.S. Pat. No. 4,292,667, entitled "Microprocessor System Facilitating Repetition of Instructions" inventors Robert Catiller and Brian Forbes, issued Sept. 29, 1981;

U.S. Pat. No. 4,293,909, entitled "Digital System for Data Transfer Using Universal Input-Output Microprocessor" inventors Robert Catiller and Brian Forbes, issued Oct. 6, 1981;

U.S. Pat. No. 4,301,505, entitled "Microprocessor Having Word and Byte Handling", inventors Robert Catiller and Brian Forber, issued Nov. 17, 1981.

The above issued patents form a foundation and background for the present application, particularly the U.S. Pat. No. 4,301,505, in FIGS. 2A, 2B and 3, and at columns 2 and 7 through 10, which provides the structure and operation of the state machine processors discussed hereinafter. These patents describe and discuss many of the elements of the data communication network and the functional operations whereby a main host computer provides I/O descriptor commands, data link word task identifiers, and receives back result descriptor words to indicate the completion or incompletion of any job task. These patents also describe the use of base connection module units which house slide-in cards which form processor-controllers, distribution control cards, maintenance cards, and other slide-in units. Each base module unit houses one or more processor-controllers and provides a distribution control (DC) card for connection and disconnection to a main host computer and also provides a maintenance card for diagnostic testing of the circuitry in the base module. These card units have been described in the above cited patents which are included herein by reference.

BACKGROUND OF THE INVENTION

By the use of the term "communication discipline" there is meant the set of rules or criteria governing the message format used by a particular remote peripheral device in its data transfer operations via communication lines to a central station with its main host computer. Some of the factors differentiating the various communication disciplines involved are: synchronous operation, synchronization, asynchronous operation, start and end of message sequence, message segment length, and so on.

Since there is no standard communication discipline which is common to all peripheral data communication terminals, it was generally required that a system include individually separate communication controllers to accommodate each different discipline handled by the system. Further, since new types of peripherals with different disciplines are often developed, this would in turn require that a new communications controller be designed on a system to accommodate this type of unit.

It has long been the purpose of those manufacturers and users of data communication networks and subsystems to increase the throughput of data per unit time and per unit amount of equipment; also to simplify and economize in the number of elements involved while providing reliable data communications to and from remote stations in the most efficient manner.

Many data communication subsystems have used controllers, not only to handle the individual idiosyncrasies of the various types of data-comm peripheral terminals, but also have used controllers with insufficient control capabilities such that the main host computer must continually be actively involved with every step of the process involving data transfers to and from the remote terminal devices.

As indicated in the previously referenced patents, one way of reducing the complexity and cost, in addition to getting better controllability of a data communications network, is to relieve the main host processor of most of its monitoring and control functions and to place them in the hands of peripheral-controllers which maintain communication capability with remote terminal devices and which, at selected times, communicate back to the main host system to send data or to receive data from it.

Often problems arise as to just how the architectural and functional structure of a network should be arranged to provide the most efficient use of components for data transfers between remote terminals and a central main host computer or a plurality of such host computers.

The presently described data communication network which permits one or more main host computer systems to operate a large plurality of remote terminal devices for data communication purposes, provides modular circuitry for controlling data transfers whereby up to 16 data communication lines from remote terminals are connected to 16 line adapters which are part of a Line Support Processor which sees to it that the various different line communication disciplines are satisfied and which then provides a common line discipline for operations with a Network Support Processor. The Network Support Processor 80 (FIGS. 1A, 1B) receives initiating data transfer instructions from either a single main host processor or any one of a plurality of up to four main host processors, and sees to the execution of the required data transfers between remote data terminals and the particular host computer which initiated the data transfer instruction. Communications between a selected Line Support Processor and the Network Support Processor are standardized and not subject to vagaries of the various disciplines required for the remote data communication terminals. The Network Support Processor and its satellite Line Support Processors constitute front-end controllers which permit distributed processing functions to occur in the architecture of the communication network.

A basic building block of the described data communication network is a Subsystem Controller designated as the Network Support Processor which relieves the main host computer of involvement with data transfer functions.

SUMMARY OF THE INVENTION

The interface circuit $105_i$ (FIG. 8) of the present invention provides the subsystem-controller (Network Support processor 80, FIG. 1A) with controlled communication lines to the main host computer and also to a plurality of line support processors (LSP's) each of which can connect up to sixteen data terminals.

The Interface Circuit provides two functional logic circuits (FIG. 8) designated as (i) MLI Interface Logic and (ii) DLI interface logic. The MLI interface logic, $100_m$, includes means for: receiving instructions from the master controller state machine, for addressing the shared memory of the Network Support Processor, providing a direct memory access transfer between the shared memory and a selected line support processor (LSP). For these operations, the master state machine $50_a$ processor uses special instructions from the slave processor $50_b$.

The DLI interface logic $100_i$ provides controlled communication between the host computer and the shared memory means of the Network Support Processor. The DLI interface logic includes a PROM Sequencer which provides a sequence of control signals for data transfer between the host computer and the shared memory 90 of the Network Support Processor.

BRIEF DESCRIPTION OF THE DRAWINGS

FIG. 1A is a network block diagram of a data communications network using the Network Support Processor; FIG. 1B is a drawing showing the mechanical arrangement of the Base Connection Module and the slide-in cards which go to make up the Network Support processor: including the interface circuit card disclosed herein.

FIG. 2 is a block diagram of the card units which make up the Network Support Processor;

FIG. 3 is a block diagram showing the basic elements which constitute the state machine processor and the interconnections to adjacent units;

FIG. 4 is a block diagram showing the elements of the memory address logic of the State Machine Processor;

FIG. 5 is a block diagram showing the elements of the data manipulation logic of the State Machine Processor;

FIG. 6 is a block diagram showing the elements of the instruction execution logic for the State Machine Processor;

FIG. 7 is a block diagram showing the external bus connections between the various elements of the Network Support Processor;

FIG. 8 is a block diagram showing the relationship of the Interface Circuit to the State machine processor, memory controller, host computer, and the line support processor to a remote terminal.

FIG. 9 is a block diagram showing the Message Level Interface logic of the Interface Circuit; FIG. 9A is a block diagram showing the major data paths of the MLI Interface Logic;

FIG. 10 is a block diagram showing the Data Link Interface logic of the Interface Circuit; FIG. 10A is a block diagram showing major details and data paths of the DLI Interface Logic;

FIG. 11 is a block diagram showing the memory control circuit of the network support processor. Each state machine processor (master and slave) is provided with such a memory control unit;

FIG. 12 is a block diagram showing the port connections to and from the RAM cards of the external shared memory means;

FIG. 13 is a block diagram of the overall Network Support Processor showing the interconnecting bus lines and the links (MLI) to an external host computer and links (DLI) to the external line communications processors;

FIG. 14 is a block diagram showing the State Machine Processor in relationship to the Interface Circuit for interrupt operations;

FIG. 15 is a block diagram showing the location of the various memory resources in the elements of the Network Support Processor;

FIG. 16 is a general block diagram showing the message transfer directions between the host computer, the Network Support Processor and the line communications processor in addition to certain firmware packets used in the Network Support Processor;

FIG. 17 is a block diagram of the Network Support Processor indicating certain firmware packets used in the master and the slave processors therein.

GENERAL

The network support processor 80, FIG. 1A, which will herein be designated as NSP, is a dual-processor, general purpose, mini-computer which is programmed as a front-end data communications processor. As discussed in the previously referenced patents, certain main host computers have been designed for systems which provide what is known as Message Level Interface (MLI) capability. It is these types of main host computer systems that are compatible with the use of the network support processor and its data communication capabilities. Thus, there is herein involved a data communication subsystem which uses the mentioned message level interface capability and which involves a series of data-comm processors. These data-comm processors are sometimes called data-comm frame-recognition processors and will herein be used with the formal name of Line Support Processor (LSP) on the idea that each of these line support processors provide data communications and control capability to a series of data communication lines which connect to communication terminals or modems. Any given data communication subsystem is controlled by a network support processor. The operation and use of the Message Level Interface has been described in the previously cited patents.

In this Data-Communications Subsystem, a host computer can support as many as four Network Support Processors (NSPs). Further, each of the Network Support Processors can support as many as four Line Support Processors (LSPs) while each Line Support Processor supports up to 16 line adapters connected to 16 remote terminals. In this wise, it is seen that a single host computer may then have the capability to control as many as 256 data communication lines. As in FIG. 1A, it will also be seen that a single Network Support Processor can interface with four separate host computers.

Referring to FIG. 1A there is seen an overall diagram of a data communications network. The Network Support Processor 80 has a connection 100$_i$ designated as the data link interface (DLI) on one side while the connections 100$_m$ on the other side are designated as message level interface (MLI). A series of host computers designated 100$_a$, 100$_b$, 100$_c$ and 100$_d$ have connection lines 15 (15$_{a,b,c,d}$) designated as MLI lines each of which connects to a Distribution Card described in the previously cited patents which have been incorporated by reference. A connection module 106$_a$ is seen supporting four Distribution Cards designated 20$_a$, 20$_b$, 20$_c$ and 20$_d$. These distribution Control Cards (DC) provide for the connection-disconnection function of any host computer system to a specific Network Support Processor and these Distributor Control Cards have been described in the cited patents, especially in U.S. Pat. No. 4,313,162.

On the other side of the FIG. 1A network, there again is seen a connection module 106$_b$ which supports distribution cards of which there is seen a typical Distribution Card DC 20. This Distribution Card 20 provides for controlled connection and disconnection to at least four Line Support Processors designated 300$_a$, 300$_b$, 300$_c$ and 300$_d$. Each of the Line Support Processors connects to a block designated "electrical interface" which may consist of up to 16 Line Adapters. The electrical interface units are designated 400$_a$, 400$_b$, 400$_c$ and 400$_d$.

As indicated in FIG. 1A, each host computer can be connected with up to four connection modules similar to 106$_a$, thus further expanding the connective possibilities of the network.

DESCRIPTION OF PREFERRED EMBODIMENT

As described in the previously cited patents, the main host computer operates on a routine whereby I/O commands are conveyed to a front-end processor for execution after which the front-end processor will return a "result descriptor" word or words to the main computer in order to indicate completion of the task or any exception conditions. The Network Support Processor communicates with the host computer systems at a "message level". This transfer process relieves the host computer of much of the overhead which would be required in supporting a data communications network. The NSP accepts messages from the host system and translates them as required, and uses the proper data communications protocol to ensure that the messages are delivered to the intended data communications device after which it returns a result descriptor word to the host computer.

Should it occur that a message cannot be delivered, the Network Support Processor maintains integrity by ensuring that the message is not lost. This is done by storing the message temporarily and returning an appropriate result descriptor word to the main host computer. Messages which are incoming from the data communications network terminals are edited and translated when necessary, and then the edited messages are placed in a queue after which message delivery is initiated when the host computer indicates a request for delivery of messages.

Referring to FIG. 1B, the hardware orientation of the Network Support Processor is shown as consisting of nine to twelve cards. A base module unit 106 is seen housing facilities for slide-in connector cards. At one end is seen a Distribution Card DC 20 and at the opposite end is a maintenance card 20$_m$ whose function has been described in the previously cited patents. The Network support Processor 80 will be seen, in its dual-processor aspect, to consist of a processor 50$_a$ designated as the MLI state machine and a second processor 50$_b$ designated as the NDL (network definition language) state machine. Each of these processors have a memory control card respectively designated as 66$_a$ and 66$_b$. The MLI state machine processor 50$_a$ connects to an interface circuit 105$_i$ which has a foreplane cable 105$_p$ which connects the Message Level Interface to the Line Support Processor 300. Connections to and from the host system are managed through the backplane of the base module 106 and through the Distribution Card 20. A series of RAM circuit cards provide for "shared memory" facilities and are designated as the elements 90.

Thus, the Network Support Processor in its hardware arrangement involves two processor cards each of which is referred to as a Universal Input/Output State Machine (UIOSM). Each of these processors has a separate memory control card (MEMCTL) designated as 66$_a$ and 66$_b$. Then the Interface card 105$_i$ (FIG. 1B) provides an external data link interface and a Message Level Interface (DLI/MLI). In addition there are the four to seven RAM cards 90 which provide the shared memory.

FIG. 2 shows a block diagram of the Network Support Processor. The state machine cards 50$_a$ and 50$_b$ are identical cards but are designated as the MLI state machine (maste processor) and the NDL state machine (slave processor). The only difference between the two processor cards are the programs in PROM and the jumpers involved. Each of the processor cards has a 16-bit processor element having as much as 32K bytes of PROM in addition to various control registers.

The master processor or MLI state machine 50$_a$ (FIG. 2) together with its associated micro-code is responsible for communication with the host computer through the Interface Card 105$_i$. The master processor 50$_a$ communicates with the slave processor 50$_b$ (NDL state machine) through the shared memory 90 and a control line 66$_i$.

The slave processor 50$_b$ (NDL state machine) and its micro-code is the source of all the NSP messages exchanged with the host computer 100. Also general programs necessary for interfacing to a Line Support Processor 300 are executed by the NDL state machine. Each memory control (MEMCTL) card 66$_a$ and 66$_b$ includes 16K bytes of "local" RAM memory. However, only the processor associated with the particular memory card has access to that local memory. The memory control card (whether 66$_a$ or 66$_b$) also has logic circuits that permit its associated processor to gain access to the shared memory 90 on the RAM cards of FIG. 1B. Logic provided on the MLI memory control card 66$_a$ acts to resolve any processor memory access conflicts, as seen in the module select logic of FIG. 11. This card also has a programmable rate generator and an interval timer.

The shared memory 90 in FIG. 2 is composed of RAM cards, each of which has 32K bytes. This memory is shared by the two (master and slave) processors on the State Machine cards 50$_a$ and 50$_b$. Access to "shared memory" 90 is controlled by the memory control units 66$_a$ and 66$_b$.

The interface circuit 105$_i$ (which is later described in conjunction with FIG. 8) has the logic which is used to interface between a host computer 100 and the Line Support Processors (LSPs) 300. The Interface Card 105$_i$ has one part called DLI or data link interface for interchange between a Distribution Card 20 and the host computer 100. The Interface Card 105$_i$ also has a foreplane connection designated Message Level Interface through which it connects to a Distribution Card, such as 20 and also the Line Support Processor 300. In addition to these external interfaces, the Interface Card 105$_i$ includes logic circuits for unit clearing, for interrupt request handling, and for master clock control (8 megahertz) for the entire Network Support Processor.

Each processor of the dual-processors of the NSP 80 communicates through 3 buses as will be seen in FIG. 3. These are the I/O bus 10, the memory address bus 16 (MADDR), and the memory data bus 12 (MEMOUT). The I/O bus 10 carries data to be written into the main memory of the host computer or transferred between registers of the master and slave State Machine processor (50$_a$, 50$_b$) or between registers on the memory control cards 66$_a$, 66$_b$, and the Interface Card 105$_i$. The MEMOUT bus 12 transfers information which is read from memory (shared memory 90). This information could be executable instructions, or memory operands, or data. The memory address bus MADDR 16 points to the current memory word that is to be written or read.

As was seen in FIG. 2, the dual master-slave processor system of the NSP consists of two sections, a MLI processing section and an NDL processing section. These make use of the previously mentioned state machine processors described in U.S. Pat. No. 4,301,505, and which are discussed hereinafter in connection with FIGS. 3, 4, 5 and 6.

MLI PROCESSING SECTION: Referring to FIG. 2, the MLI processing section of NSP 80 consists of the master processor 50$_a$ (MLI state machine), the MLI memory control unit 66$_a$ which connect to the Interface Card 105$_i$.

The processor is driven by instructions from PROM 66$_m$, FIG. 11 in addition to RAM which is located on the memory control unit 66$_a$ and from instructions in the shared memory 90, FIGS. 2, 12. The MLI state machine master processor 50$_a$ determines the type of host data transfer to be accomplished and also controls the Line Support Processor data transfer through the MLI port 105$_p$ (FIG. 1B) of the Interface Card 105$_i$. The MLI processing section of the NSP communicates with the slave processor 50$_b$ (NDL state machine) through the shared memory 90. The Interface Card 105$_i$ has a PROM that permits this card to interface the MLI state machine to the host computer 100 at a high level mode. The Interface Card 105$_i$ handles the details of the actual data transfer.

NDL PROCESSING SECTION: As seen in FIG. 2, the NDL processing section consists of the slave processor 50$_b$ (NDL state machine) which is driven by local memory (66$_n$, FIG. 15) located on the NDL memory control card 66$_b$ or which is driven by data from the shared RAM memory 90. The State Machine PROM (program memory) has a boot strap that loads program information from the host computer over to Local memory (in the memory control 66$_b$) and to Shared RAM, when the Network Support Processor is initialized. This program then drives the NDL state machine 50$_b$ (slave processor).

The NDL processing section provides communication with the Line Support Processor 300. Communication is done through shared memory 90 and the Interface Card 105$_i$ all under the control of the MLI state machine 50$_a$. Data transfers to and from the Line Support Processor 300 are controlled by a direct memory access (DMA) logic circuit located on the Interface Card 105$_i$ (also see FIG. 7 and discussion thereof). This DMA logic circuit is operated under the control of the MLI state machine 50$_a$.

When the MLI state machine 50$_a$ has a block of data for the LSP 300, the data is placed in Shared Memory 90. The NDL slave state machine 50b notifies the MLI state machine 50a by means of an interrupt signal that the LSP is available. The MLI 50a master state machine then directs the Interface Card 105i to transfer the data from Shared Memory 90 over to the LSP 300 via the message level interface channel 105p. Similarly, when the Line Support Processor 300 has data destined for the NDL state machine 50b, the data is also placed in Shared Memory 90 under the control of the MLI state machine 50a. The MLI state machine 50a then signals the NDL state machine 50b by means of interrupt signals that the Line Support Processor data is now available. MEMORY FOR NETWORK SUPPORT PROCESSOR: The Network Support Processor (NSP) includes two basic types of memory which are: programmable read only memory (PROM) and random access memory (RAM). In the preferred embodiment of the Network Support Processor, the PROM configuration of the MLI state machine is made to hold 8K bytes while the NDL state machine is made to hold 2K bytes. The PROM is accessible only to the processor state machine in which it is located.

Each of the memory control cards 66a and 66b (FIG. 2) will have 16K bytes of local RAM that is accessible only to its associated state machine processor. On the other hand, the Shared RAM Memory 90 is available to either of the two processor state machines 50a and 50b.

During a memory access operation, the clock (8 megahertz) period is delayed in order to produce the appropriate memory timing. All memory Write operations require three clock periods. All PROM and Local Memory Read operations require one clock period while a Shared Memory Read operation requires two clock periods.

UNIVERSAL INPUT/OUTPUT STATE MACHINE PROCESSOR: As seen in FIG. 3 the major functional elements of the Universal Input/Output state machine processor is shown and the connections to adjacent units. Both the master processor state machine and the slave processor state machine 50b are logically identical except for programs in PROM 50 of their program memory. Each card has processing logic circuits that control the sequence of operations for the Network Support Processor. The processing circuits consist of memory addressing logic 41, program memory PROM 50, data manipulation logic 32, 33, 34, instruction execution logic 23 and external bus logic 60L. The processing logic interfaces the state machine to other circuits in the Network Support Processor. While these functions are described in the previously cited patents, a brief summary of these elements will be described herein.

MEMORY ADDRESSING LOGIC: The processor state machine memory addressing circuitry is shown in FIG. 4. The addressing logic is made of a Program Counter (PC) 41', a Memory Reference Register (MRR) 40, a Stack Memory 45, a Repeat Counter 42. The PC 41' and MRR 40 are used as the memory address pointers. Reference is made here to U.S. Pat. No. 4,301,505 at FIGS. 2A, 2B, and at columns 16 and 17.

The PC 41' points to the current instruction or to the operand for that instruction. As each instruction is executed, the PC 41 automatically increments and then points to the next instruction. The instruction can either reside in the state machine PROM 50, or in Local Memory 66m of FIG. 7, or Shared Memory 90.

The memory reference register (MRR) 40 is used to store the address of the next operand when the operand address cannot be stored at PC+1 (incremented program counter 41'). For instance, when the program must examine the contents of a word of data, the MRR 40 is loaded with the address of the data word. This allows any of the various state machine instructions to be executed while using this data word as the operand.

Repeat Counter 42 is a register that can cause an operation to be repeated up to 256 times. The Repeat Counter 42 is loaded with a value of zero through 255 and is decremented with each repeated operation. When the Repeat Counter underflows (has a value less than zero) then the repeat operation is terminated and the next instruction is fetched. The address source of the memory operand (which is the MRR 40 or the PC 41') is automatically incremented with each execution of the repeated operation. The Stack Memory 45 is used to retain the current program address when a subroutine is called for, and then used to restore that address when the subroutine is terminated with a "RETURN" instruction. The Stack Memory 45 can retain as many as 16 addresses which permit storage of 16 nested subroutines.

PROM: The PROM 50, as used on the processor state machine, is, in the preferred embodiment, an 8K byte storage element. Use of this program memory is discussed in U.S. Pat. No. 4,301,505 at columns 7 through 10.

DATA MANIPULATION LOGIC: In FIG. 5 there is seen a block diagram of the data manipulation logic of the UIO state machine processor. This data manipulation logic is made of 16 general purpose accumulators (designated as element 30) an operand register 31, an arithmetic logic unit (ALU) 32, a byte-swap circuit 34 and a shift logic circuit 33. The 16-bit registers of the accumulators of accumulator 30 are used to store information for manipulation and also to retain the results of the various operations. Details of these operations will be found in U.S. Pat. No. 4,301,505 at columns 8 through 11.

The operand register 31 holds the operand of the current instruction. The ALU 32 receives data from the operand register 31 and the accumulator 30. A variety of logical and arithmetic operations are then performed on the data, as has been mentioned in the previously cited reference patents. The ALU 32 provides output to the byte-swap logic circuit 34 and the shift logic circuit 33.

The byte-swap logic output is used to replace the sequential order of the byte sequence provided by the ALU 32. In byte-swapping, the most significant byte of the ALU output is exchanged with the least significant byte, and similarly the least significant byte is exchanged with the most significant byte in sequential order.

The shift logic circuitry 33 can be used to shift or to rotate the ALU output to the left or to the right. Also, the shift logic circuitry can also transfer the ALU output directly and without alteration.

INSTRUCTION EXECUTION LOGIC: In FIG. 6 there is seen a block diagram of the instruction execution logic of the UIO state machine processor which is described also in U.S. Pat. No. 4,301,505 at columns 7 through 18. The instruction execution logic circuitry is made of an instruction register 22, an instruction decoder set of PROMS and latching registers for the output of the PROMS at element 23c. The instruction register 22 holds the current state machine instruction. This current instruction is received from the PROM 50, in the state machine, or from either local $66_m$ or shared memory 90. The instruction decode PROMS $23_c$ are addressed by the instruction register 22. The PROMS $23_c$ decode the instructions into 40 different control signals that control the operation of the state machine processor (such as chip enable, counting controls, etc.). The output of the decoder PROMS $23_c$ is latched by registers when required for timing or for signal stability.

EXTERNAL BUS LOGIC: Referring to FIG. 7, the major external buses of the state machine processor $50_a$ are seen connected to the Interface Card $105_i$ and the memory control card 66. These buses going external to the state machine $50_a$ are the I/O bus 10, the memory address bus (MADDR 16), the memory data-out bus (MEMOUT) 12 and the Put/Get Enable Line $60_{pg}$.

As seen in FIG. 7, the memory address bus 16 and the I/O bus 10 also connect to the memory control card 66 which holds its own Local Memory $66_m$. Also, the memory data-out bus 12 can receive data from the memory control card 66 along the bus extension 12'. The memory control card 66 has a data bus 12" and also an address bus 16" which connects to the Shared Memory 90. The I/O bus 10 and 10' is used to transfer information to Local Memory $66_m$ and to the Shared Memory 90. I/O bus 10 is also used to bring instructions and data back into the state machine processor $50_a$.

The memory address for the MADDR bus 16 is generated on either (a) the State Machine Processor $50_a$ or else (b) the Interface Card $105_i$. The State Machine addresses either the Local Memory $66_m$, the Shared Memory 90 or the PROM 50 (FIG. 4). The Interface Card addresses Local or Shared Memory during direct memory access (DMA) only. In the previously cited patents, which involved the Universal I/O State Machine Processor and which patents have been heretofore cited and incorporated by reference, it will be seen in FIG. 2B of these patents (such as U.S. Pat. No. 4,301,505) that there was described two control registers 37, 38. These are called application control registers and are used to store information for logic which is external to the State Machine Processor $50_a$. These application control registers are unique in that the registers receive data which is generated on the State Machine Processor but the data in the control registers is clocked by signals that are generated on cards other than the State Machine processor $50_a$.

In FIG. 7 the Interface Card $105_i$ will be seen having a data link interface (DLI) to the host computer 100 and also a message level interface (MLI) to the Line Support Processor 300. In addition, the Interface Card has an interrupt line and an interrupt acknowledge line between itself and the State Machine processor. The memory control card 66 also has a control line $66_i$, FIGS. 2 and 7, for interchange of signals between the NDL slave processor $50_b$ and master processor $50_a$.

INTERFACE CARD: The major elements of the Interface Card $105_i$ are shown in the block diagram of FIG. 8. The Distribution Card $20_a$ connects, via the data link interface (DLI), to the Data Link Interface Logic $100_i$.

The Distribution Card 20 connects to the MLI logic $100_m$ via the bus $105_p$. The MLI memory control card $66_a$ connects to the message level interface logic $100_m$ by means of buses 16 and 12. The message level interface (MLI) State Machine Processor $50_a$ connects via the frontplane I/O bus 10, to the DLI logic $100_i$, to the PROM sequencer $100_{ps}$ and to the MLI Logic $100_m$.

The Interface Card $105_i$ furnishes a data link interface (FIG. 7) between the host computer system 100 and the Network Support Processor; and it also furnishes a message level interface (FIG. 7) between the Network Support Processor and the Line Support Processor (LSP) that it controls, FIGS. 8, 9, 9A, 10 and 10A. In summary of FIG. 8, show the Interface circuit provides a MLI section logic unit $100_m$, and a DLI logic unit $100_i$ with its PROM sequencer $100_{ps}$. As was seen in FIG. 1B, the Interface Card communicates with the other NSP circuitry through foreplane connectors.

Interface Circuit (detailed description)

The interface circuit $105_i$ as seen in FIG. 8 provides the interconnecting links between the host computer 100 (via the distribution card $20_a$) and between the Line Support Processor (LSP) 300 (via the Distribution Card 20) to the MLI state machine processor-controller $50_a$ via the I/O bus 10, and to the memory control circuit $66_a$ via the memory address bus 16 and the memory data out bus 12.

The interface circuit provides the Network Support Processor 80 with the following functions:
(a) clock and clock control logic;
(b) a backplane interface to the host system 100 which obeys the MLI protocol and frees the state machine processor-controller from much of the protocol details;
(c) maintenance control logic;
(d) clearing mechanisms which satisfy the requirements of shared systems; on-line maintenance, etc.;
(e) an asynchronous MLI interface for the state machine processor-controller which allows the Network Support Processor (NSP) to act as a "host" and which can drive any outboard MLI compatible data link processors (DL) such as LSP 300.
(f) logic to coordinate interrupt requests and host computer DMA data transfer requests to give the NSP interface priority over host interface operations;
(g) interrupt logic in order to reduce the state machine processor-controller's response time for serving the NSP interface and to remove polling considerations from the software design requirements.

The state machine processor-controller communicates with and controls the Line Support Processor interface and the host computer interface through a set of "GET" and a set of "PUT" operators, described in the cited U.S. Pat. No. 4,301,505.

The NSP 80 (FIG. 2) can control the flow of data between the host computer 100 and the Line Support Processor 300, can specify various protocol sequences, detect transmission and protocol errors and perform other tasks through use of the "PUT" and "GET" operator using registers which are situated on the interface circuit.

General System Overview: The base connection module 106 (FIG. 1A) is a basic building block for the Network Support Processor subsystem. The base connection module consists of a backplane into which various cards and modules fit. For example, these modules may consist of one to six distribution cards (DC) 20 for communication with selected host systems, a Network Support Processor such as is shown in FIG. 1B, a maintenance card $20_m$ and other cards as required. The typical Network Support Processor 80 contains the dual set of state machine processor-controllers and an interface circuit comprising interface logic to interface the Network Support Processor with the Distribution Card and the maintenance card, and additional interface circuitry to connect an addressed and selected line communication processor called LSP (Line Support Processor 300) which connects to data comm lines.

The Distribution Cards (20, 20$_a$, FIG. 1A) are used to provide a connection path (DLI, 100$_{ix}$) between the "asynchronous" host message level interface (MLI, 100$_{mx}$) and the "synchronous" NSP interface, DLI, 100$_{ix}$. The MLI is an asynchronous interface used between any senior system (such as a host computer) and a subordinate unit. The host computer unit 100 initiates an I/O operation by sending an I/O descriptor to a processor in the network. The processor then performs the specified operation, requesting data from or sending data to the host computer as required, and finally sending a Result Descriptor to the host computer upon completion of the operation. The subordinate processor must be ready to accept another I/O descriptor from the host computer immediately after a Result Descriptor is sent to the host computer. I/O descriptors are of variable length and it is the responsibility of the subordinate processor to ensure that the proper number of words are received to fulfill the I/O descriptor command. Vertical and longitudinal parity are checked for all MLI transactions but no provision is made for recovery should an error be detected (other than to abort an I/O operation).

Once a Distribution Card has provided a connection between the host computer and a network support processor (NSP), the Distribution Card becomes transparent to communication between the host computer and the Network Support Processor. The Network Support Processor's communication with the host is accomplished by a standard sequence of status signals, which indicates to the host computer the access requirements of the Network Support Processor. When a Network Support Processor is connected to the host, all information transfers are as indicated by the NSP status lines. The Network Support Processor is provided with interface logic via the interface circuit card; this generates the NSP status in fixed sequences to control the communication between the host and the NSP as requested by the processor controller 50$_a$ (FIG. 2). All data transfers to or from the host computer are through a FIFO stack register buffer (100$_{i3}$, FIGS. 10; 10A) contained within the interface logic 105;

Referring to FIG. 9A, there is seen a block diagram of the MLI Interface Logic 100$_m$ of FIG. 8.

As noted in FIGS. 2 and 8, the Interface Card, 105$_i$, connects the MLI State Machine processor-controller 50$_a$ to the host computer 100 and the LSP (Line Support Processor) 300.

In FIG. 9A, the LSP 300 is connected by the MLI Data Bus 105$_p$ to the State Machine's Shared Memory Output Bus 12 through driver 60$_m$. The MLI Data Bus 105$_p$ also connects to transmitter-driver 60$_{tx}$ and receiver-driver 60$_{rx}$.

The State Machine 50$_a$ connects via I/O bus 10 to DMA transfer counter 160$_{tc}$ and Address Counter 160; in addition bus 10 connects to Control Register 60$_{cr}$, to Data Register 60 and receiver-driver 60$_{rx}$.

The DMA Transfer Counter 160$_{tc}$ provides its output to DMA Address Counter 160 which connects to driver 160$_d$ whose output address bus 16 connects to memory control 66$_a$ and the State Machine 50$_a$.

The Control Register 60$_{cr}$ connects to Control Logic 60$_s$, which provides control signals to the interface circuitry and to status driver 60$_t$.

The Data Register 60 receives its input via the I/O bus 10 and sends its output through transmitter-driver 60$_{tx}$ to LSP 300.

In FIG. 10A, the Data Link Interface Logic 100$_i$ (FIG. 8) is seen in block form.

The State Machine I/O bus 10 from the Memory Control 66$_a$ and State Machine 50$_a$ connects to receiver-driver 100$_{i5}$ and to the Start Address Register 100$_{i8}$ of the PROM sequencer 100$_{ps}$.

The Receiver-Driver 100$_{i1}$ connects to host computer 100 and feeds through Data Latching Register 100$_{i2}$ to FIFO 100$_{i3}$. The FIFO output is inverted by driver-inverter 100$_{i4}$ and checked by parity tree 100$_t$. The FIFO output also activates MLI counter 100$_{ct}$ and passes data to receiver driver 100$_{i5}$ for transfer to master processor 50$_a$, memory control 66$_a$ where it can be placed in shared memory 90.

The PROM sequencer 100$_{ps}$ of the DLI interface logic is constituted in FIG. 10A by elements 100$_{i8}$, 100$_{im}$, 100$_r$ and 100$_{br}$.

Control signals are provided by the output from PROM 100$_{im}$ to output register 100$_{or}$.

Register 100$_{or}$ provides the normal next address to PROM 100$_{im}$ and a branch control signal also, in addition to control signals for the DLI Interface Logic 100$_i$ for 100$_m$, for 50$_a$ and for LSP 300.

I. Transfer of Data from Host Computer to NSP Memory to Line Support Processor

Referring to FIG. 10A, data from host computer 100 is transferred along the backplane data lines to receiver-driver 100$_{i1}$ and latched in data register 100$_{i2}$ for loading up to 64 words in FIFO register 100$_{i3}$.

The State Machine 50$_a$ initiates a PUT address instruction to PROM Sequencer Start Address Register 100$_{i8}$ to start the address sequencing of PROM 100$_{im}$.

PROM 100$_{im}$ will then output a series of control words via PROM Output Register 100$_{or}$ as is illustrated in Table A-6 hereinafter.

The lower portion of FIG. 10A, including start-address register 100$_{i8}$, PROM 100$_{im}$, PROM Output Register 100$_{or}$ and Branch Logic 100$_{br}$, constitute the PROM Sequencer 100$_{ps}$ of FIG. 14.

A PUT instruction from the State Machine 50$_a$ (which instruction can be repeated 64 times) will load 64 words into the FIFO register 100$_{i3}$, FIGS. 10, 10A. The MLI Counter 100$_{ct}$ will be loaded with the number of words to be transferred.

If 50 words are to be transferred from Host 100 to NSP Memory 90, then when the MLI Counter 100$_{ct}$ counts the transfer of 50 words to the FIFO, the Counter will send an "interrupt" to the State Machine 50$_a$. The State Machine 50$_a$ will now provide a GET instruction (repeated 50 times) to remove the 50 words from the FIFO to the Shared Memory 90 of State Machine 50$_a$ via Memory Control 66$_a$.

Any parity errors will be sensed by Parity Tree 100$_t$ to set a flip-flop which will form a parity error signal to the State Machine 50$_a$.

The 50 words from the host computer main memory have now been transferred to shared memory 90 (FIG. 2). Now it remains for these words to be sent to a selected line communications processor (LSP 300) for transfer to a selected peripheral terminal.

Referring to FIG. 9A, the State Machine memory output bus 12 connects to data driver $60_m$ and to bus $105_p$ which connects to LSP 300 for data transfer. This may also be seen in FIG. 7 where Shared Memory 90 has an output bus 12' which becomes bus 12.

The State Machine $50_a$ provides a PUT instruction to Data Register 60. The I/O bus 10 from the State Machine provides control words onto bus $105_p$ to select a particular LSP 300 while control logic $60_s$ controls bus $105_p$ via strobe signals.

Using the memory output bus 12 and DMA (Direct Memory Access) Driver $60_m$, a burst of data words may pass from Shared Memory 90 directly to the selected LSP 300.

However, if the Non-DMA mode is used, the State Machine $50_a$ could transfer words on I/O bus 10 to Data Register 60 to Data Driver (Non-DMA) $60_{tx}$ to bus $105_p$ to the selected LSP 300.

Using the DMA mode for rapid data transfer, in FIG. 9A, the I/O bus 10 carries a PUT instruction from State Machine $50_a$ which loads DMA transfer counter $160_{tc}$ with the number of words to be transferred, for example, 50 words. Also the DMA address counter 160 is loaded with an address (memory address pointers) to select the starting area of Shared Memory 90 for data transfer.

Then MLI Control Register $60_{cr}$ is loaded to start the DMA operation. The Control Register $60_{cr}$ controls interface operations as indicated in Table A-2 hereinafter and uses Control Logic $60_s$ and DMA PROM $60_{sp}$ for DMA operations. The Control Register $60_{cr}$, Control Logic $60_s$, Control PROM $60_{sp}$ and Driver $60_t$ may be designated as the "DMA Logic".

The Control Logic $60_s$ will enable memory output bus 12 DMA driver $60_m$ and MLI Data Bus $105_p$ for direct burst of word transfers from Shared Memory 90 to the selected LSP 300.

The Control Logic $60_s$ will decrement DMA Transfer Counter $160_{tc}$ for each word transferred and will increment the DMA address counter 160 in order to point to the address of each of the next words to be transferred.

II. Transfer of Data From Line Support Processor to NSP Memory to Host Computer Memory Referring to FIG. 9A, the state machine $50_a$ will poll the various Line Support Processors (LSP 300) to find which is ready to transfer information and instruct that LSP send its data on MLI Data Bus $105_p$ where it is received by Receiver $60_{rx}$ and passed on I/O bus 10 to Shared (NSP) Memory 90 via memory control unit $66_a$.

Then the State Machine $50_a$ will use repeated PUT instructions to load FIFO $100_{f3}$, FIG. 10A, with data words from memory 90. Then the State Machine $50_a$ will activate the PROM Sequencer $100_{ps}$ so it can generate control signals to handle word transfers from FIFO $100_{f3}$ to the memory of the host computer 100.

Output "registers" (which are actually software instructions) in the interface logic are loaded by the state machine processor-controller via the execution of "PUT" statements. These are: the Clear instruction used to clear the FIFO and to clear parity error flip-flop; the PUT address instruction is used to load the microcode starting address of a MLI sequence and also to load the data transfer counter $160_{tc}$ of FIG. 9A; and a PUT FIFO instruction which is used to load data into the FIFO for subsequent transmission to the host computer.

Communication to the state machine master processor-controller $50_a$ from the data link interface logic $100_i$ (FIG. 8) is accomplished via "GET" instructions. The following elements, here called "registers", are actually software instructions for the data link interface logic of FIG. 10A, except for status register 200 discussed below. The status register 200 (in PROM sequencer $100_{ps}$, FIG. 8 and in FIG. 14) contains the current status of the data link interface; an internal Count Register (in PROM sequencer $100_{ps}$) contains the current value of the transfer counter $100_{ct}$; the GET FIFO instruction is used to access data (in the FIFO $100_{f3}$) received from the host computer 100. An eight bit register is also provided to interrogate the system's unique identification number, SUID (which is settable by eight jumpers located on the board).

When the internal clear register is accessed via a "PUT" instruction, then the FIFO $100_{f3}$, the vertical parity error flip-flop, and the internal Count Register are reset.

"PUT" FIFO Register: This register $100_{f2}$ (FIG. 10A) is used to load the FIFO $100_{f3}$ from the state machine processor-controller with either a "PUT" or with a "Repeat PUT" instruction. When a transfer is requested from a Network Support Processor to the Host Computer, the FIFO $100_{f3}$ must be loaded with three words of Descriptor Link followed by the message text, followed by the data message longitudinal parity word (LPW). The FIFO $100_{f3}$ holds 64 words of 16 bits each or 128 bytes.

"GET" FIFO Register: Data sent by the host computer is stored in the FIFO $100_{f3}$ as it arrives at the data link interface, FIG. 10. This data can be accessed by the Network Support Processor (and its state machine processor-controller) via the use of "GET" statements to the FIFO Register $100_{f3}$. Each time data is taken from the FIFO $100_{f3}$, the FIFO is advanced to the next word.

"PUT" Address Register: This register $100_{i8}$ (FIG. 10A) is used to initialize the data link interface logic by loading a microcode sequence starting address and a word count into the interface logic. The low order eight bits represents the value to be loaded into the MLI counter $100_{ct}$. The high order eight bits of the register are used to specify the MLI sequence to be performed. The counter is used to count the words transferred over the message level interface.

"GET" Count Register: The least significant eight bits of the "GET" count register contain the count value of the transfer counter $160_{tc}$, in complement form.

"GET" Status Register: A status register (200, FIG. 14) provides information about the current state of the MLI interface logic and the DLI interface logic. The 16 bits of the status register are defined as follows:

TABLE A-1

| Bit | Value |
| --- | --- |
| 0 | DLP Status 1 |
| 1 | DLP Status 2 |
| 2 | DLP Status 4 |
| 3 | DLP Status 8 |
| 4 | PROM Status 0 |
| 5 | PROM Status 1 |
| 6 | PROM Status 2 |
| 7 | DLP Connected |
| 8 | DLP Service Request |
| 9 | DLP Cleared |
| 10 | Address Reject |
| 11 | DLP Vertical Parity Error |
| 12 | Always 1 |

TABLE A-1-continued

| Bit | Value |
|---|---|
| 13 | Always 1 |
| 14 | Always 1 |
| 15 | Always 1 |

Note:

The LSP 300 is a type of DLP (Data Link Processor) and later references to DLP should be understood to include LSP (Line Support Processor) 300.

Notes:

DLP Status 1, 2, 4, 8 are the status bits the DLP is currently presenting to the host computer. PROM Status 0, 1, 2 are three bits used to indicate the condition of the MLI protocol to the state request is present. Address reject is used as a flag indicating a failed attempt to load the Address and the Count Register.

State Machine Interface to LSP (FIG. 9A): To the software, the interface is viewed as a set of registers and drivers which are accessed via "GET" and "PUT" instructions from the state machine. Direct memory address (DMA) capability is provided to speed data transfers over the MLI but the state machine software is responsible for implementation of the MLI protocol and must control all MLI operations.

Strobe Register: A "PUT" to the strobe register creates a 62 microsecond pulse on the MLI SIO line, which is used to clock output data and to acknowledge receipt of input data. A flip-flop called the "Strobe-Received Flip-Flop" is reset.

Send Data Register: A "PUT" instruction from the state machine to the "Send" Data Register 60 loads 16 bits of data plus one parity bit from the I/O bus into a data register 60, FIGS. 9, 9A. The data is then driven on to the MLI data lines.

Read Data Register: A "GET" from this register will transfer the current contents of the MLI data lines to the state machine on the I/O bus 10.

MLI Control Register (FIG. 9A): A PUT to the Control Register $60_{cr}$ will set various flip-flops which control the operation of the interface. These bits are as follows:

TABLE A-2

| Bit | Action |
|---|---|
| 0 | Set MLI parity error flip-flop |
| 1 | Address Select |
| 2 | Terminate or Master Clear |
| 3 | Access Granted |
| 4 | Transmit |
| 5 | Channel Select |
| 6 | DMA Enable |
| 7 | Normal Mode |
| 8 | Expected DLP Status 1 |
| 9 | Expected DLP Status 2 |
| 10 | Expected DLP Status 4 |
| 11 | Expected DLP Status 8 |
| 12 | Not Used |
| 13 | Not Used |
| 14 | Not Used |
| 15 | Reset DLP Strobe Flip-flop |

Notes:

(a) Any "PUT" to the control register $60_{cr}$ will reset the MLI reset flip-flop.

(b) The MLI parity error flip-flop ($60_p$), FIG. 9A, will set whenever a word with bad parity is transferred to the state machine from the MLI data lines. The reset bit is set and then reset (i.e., the bit creates a level to the reset input of the flip-flop, and not a pulse).

(c) The Address Select, Terminate or Master Clear, Access Granted and the Channel Select bits correspond exactly with the signals of the same name on the message level interface (MLI).

(d) The Transmit bit enables the MLI interface to drive the MLI bi-directional lines. Control of this bit must be closely coordinated with the MLI protocol.

(e) The DMA enable-bit must be set in order to initiate a DMA operation, and reset otherwise. Bit 8, 9, 10, 11 (the Expected DLP status bits) are compared with the received DLP status bits while the MLI is in the direct memory access DMA mode. If the DLP status changes, the MLI will exit the DMA mode. When the Normal Mode bit is reset, the MLI logic is placed in maintenance mode. In maintenance mode the ADDSEL.1, AG plus SIO/1 and TRM plus MC/1 signal line on the MLI interface are put into a "high" state. Also, a received DLP strobe is simulated for any condition which would normally generate a SIO pulse on the MLI interface. Thus, maintenance can be performed without a MLI cable present.

(f) The four bits of "Expected DLP Status" are latched and compared with the actual DLP status received from the MLI cable. The expected and the actual status must be the same in order to enter and remain in the DMA operation.

(g) The Reset DLP strobe bit is used to reset the DLP strobe flip-flop which is normally set upon receipt of the signal DLPST and is reset by PUTs to the strobe register.

DMA Address Register (FIG. 9A): A PUT instruction to the DMA address register counter 160 loads the 16 bit address counter with the address of a buffer area in memory ($66_a$, 90) which is to receive or provide data during a DMA operation. The address register counter 160 increments by one after each word transfer. During a DMA cycle, the contents of the address register counter are placed on the state machine address lines 16. All address mapping and all relocation features of the memory control card $66_a$ are enabled during a direct memory access DMA cycle. The PROM 50 on the state machine 50a may not be accessed during DMA operations.

Set MLI Count: This is done in the DMA transfer counter register $160_{tc}$. This uses a PUT instruction to specify the maximum number of words transferred during a direct memory access (DMA) operation. The number may range from 0 to 255 words as loaded and read in complement form. The most significant eight bits of the register are not used.

GET MLI Count: This is an instruction which uses part of the DMA transfer-counter register $160_{tc}$. The lower eight bits of this register contain the value of the DMA counter register $160_{tc}$ in complement form. The most significant eight bits are always set true.

MLI Status Register (FIG. 9A): This register $60_{st}$ enables the driver $160_d$ for conveying addresses to the state machine $50_a$ and the memory control card $66_a$. The MLI status register contains a number of bits which indicate the MLI status as defined hereinbelow:

TABLE A-3

| Bit | Meaning |
|---|---|
| 0 | Received DLP Status 1 |
| 1 | Received DLP Status 2 |
| 2 | Received DLP Status 4 |
| 3 | Received DLP Status 8 |
| 4 | DMA Over |
| 5 | DLP Strobe Received Flip Flop |
| 6 | MLI Parity Error |
| 7 | MLI Not Reset |
| 8 | — |
| 9 | — |
| 10 | — |
| 11 | — |
| 12 | — |
| 13 | — |

TABLE A-3-continued

| Bit | Meaning |
|---|---|
| 14 | — |
| 15 | — |

The status register is provided with bit fields as indicated below which have the meanings explained:

Bits 0-3: These bits indicate the status presented to the MLI by the data link processor (DLP) on the lines designated STC 1, STC 2, STC 4, STC 8.

Bit 7: This bit is cleared when the DLP is "Hard Cleared" and set when the MLI interface is initialized. No bi-directional MLI signal lines are driven by the MLI until the interface is initialized.

Bit 5: This bit is set when the signal DLPST is received and cleared by either a PUT to the strobe register which generates a SIO pulse, or by bit No. 15 of the MLI control register $60_{cr}$ which does not generate a SIO pulse.

Bit 6: This bit is set whenever a word with bad parity is received from the MLI. It is reset by bit No. 0 of the MLI control register $60_{cr}$.

Bit 4: This bit is used to determine the cause of termination of a DMA operation. The DMA operation may be stopped because of a time-out condition (2 microseconds) which may or may not represent an error condition, or it may terminate because of either a status change by the Data Link Processor or a buffer overflow condition. The signal DMAOVER will be called "high" if the DMA was terminated due to a DLP status change or a DMA count overflow.

DMA OPERATIONS

DMA Write Operation: To initiate a "DMA Write" operation, the state machine processor 50a must initialize the DMA hardware as follows hereinbelow, although not necessarily in the order presented herein:

1. Load the DMA address counter 160 (FIG. 9A) with a value which is one less than the word address of the buffer which contains the data to be written to the Data Link Processor (DLP) as, for example, line support processor LSP 300. The address is incremented by one before each word is sent.

2. Load the DMA count register $160_{tc}$ with a value C which is calculated as follows:

C = the complement of the count minus 1 where the "count" is a number of words to be sent to the Data Link Processor before any status changes are expected.

3. The state machine must be "connected" to the Data Link Processor.

4. The MLI control register $60_{cr}$ must be loaded with the following data:
 (a) The transmit bit set (bit 4)
 (b) DMA Enable bit set (bit 6)
 (c) Expected DLP status initialized to the DLP status (bits 8, 9, 10, 11).
 (d) Normal mode set (bit 7)
 (e) All other bits reset.

Once the MLI hardware is initialized, there will be caused the following sequence:

1. The hardware will wait for the state machine to enter a fetch cycle by waiting for FETC8/ to go "low". When that happens, assuming the MLI interface is not ready to cause an interrupt, then the signal SDMARQB goes "high" into the DMA control PROM ($100_{im}$). The PROM output SDMARQ (DMA Request) then goes "high".

2. On the next leading edge of WTCLK (WTCLK is a 62 microsecond pulse which begins at the end of each memory cycle) the DMARQ flip-flop $60_r$ sets. When DMARQ is set, the clock-enable signal to the state machine is put in a "false" state, thus "freezing" the state machine.

3. On the next leading edge of WTCLK, the DMAGNT flip-flop sets. When this DMAGNT flip-flop is set, it causes the following to happen:
 (a) The state machine address drivers are tri-stated and the DMA address drivers are enabled causing the memory address to be driven from the DMA address counters of 160.
 (b) The state machine I/O bus drivers are tri-stated.
 (c) The asynchronous clear signal to the cycle flip-flop is removed.
 (d) The DMA count register $160_{tc}$ and the DMA address register counter (160) are allowed to count if the DMA control PROM output "AINCEN" (address increment enable) is true.

4. Wait for the conditions of either 4A or 4B (see below) at a leading edge.

4A. If the DLP SYNCH signal is high (i.e., the DLP is ready to receive a word of data from the memory buffer) and if the signal DMAOVR/ is high (that is the DLP status matches the expected DLP status and the DMA count register is not 0) and if the host MLI interface is not ready to interrupt, then on the next leading edge of WTCLK, the following happens:
  1. Set of the cycle flip-flop.
  2. Increment of the DMA count register $160_{tc}$ by one.
  3. Increment of the DMA address register counter 160 by one.
  In waiting for the next leading edge of WTCLK
   (a) Load the DMA data latch with the data from the memory buffer.
   (b) Generate a SIO strobe to the Data Link Processor (DLP).
   (c) Reset the signal DLPSYNCH and the DLP strobe received flip-flop.

4B. If the DLP SYNCH is "high" and the signal DMAOVR/ is "low" or if time-out is true, or if the MLI host interface is ready to interrupt, then do the following:
  1. Reset DMARQ. This allows the state machine to resume execution.
  2. Reset DMAGNT—this allows the state machine to drive the address and the I/O buses.

The DMA operation is now over. If the state machine determines (by interrogating the contents of the MLI status register) that the cause of the termination of the DMA was due to time-out that it is desired that DMA be re-entered, then all that is required to re-enter DMA mode is to reload the MLI control register $60_{cr}$ (with no change in any of the bits).

DMA Read Operations (FIG. 9A): To initiate a DMA "Read" operation, the state machine must initialize several registers in the MLI hardware as follows:

1. Load the DMA address register 160 with the word address of the memory buffer to receive data from the data link processor (DLP), such as LSP 300.
2. Load the DMA count register $160_{tc}$ with the complement of the number of words to be read.
3. Connect to the data link processor (LSP 300).

4. Load the MLI control register $60_{cr}$ with the following data:
   (a) DMA enable bit set (bit 4).
   (b) Normal mode bit set (bit 7).
   (c) Expected DLP status bits initialized to the DLP status (bits 8, 9, 10, 11).
   (d) All the bits reset.

Once the MLI hardware is initialized, it will cause the following DMA Read sequence to occur:

1. Wait for the state machine to enter the fetch state (that is, FETCH/ goes low). then FETCH/ is low, the signals SDMARQB and SDMARQ will go high.
2. On the next leading edge of WTCLK the DMARQ flip-flop will be set, causing the state machine to freeze due to removal of the clock-enable to the state machine.
3. The next leading edge of WTCLK, the DMAGNT flip-flop will be set allowing several things to happen:
   (a) The state machine address drivers are tri-stated and the DMA address drivers are enabled allowing the memory to be driven by the DMA address counters.
   (b) The state machine I/O bus drivers are tri-stated and the MLI receive-data buffers are enabled allowing the I/O bus to be driven with data received from the DLP over the (MLI) Message Level Interface.
   (c) The asynchronous clear signal is removed from the cycle flip-flop; and
   (d) The DMA count register $160_{tc}$ and the DMA address counters 160 are allowed to count when the AINCEN signal from the DMA control PROM is true.
4. Wait till either the conditions of paragraph 5 or 6 below are satisfied at the time of the leading edge of WTCLK and behave accordingly.
5. If (i) timeout is false and (ii) the MLI host interface is not ready to interrupt, and (iii) DLP SYNCH is true (that is, the DLP has presented valid data on the MLI cable), and (iv) DMAOVR/ is high (i.e., the DLP status matches the expected DLP status and the buffer in memory is not full) then set the cycle flip-flop initiating "memory write cycle" to store the data into memory. On the next leading edge of WTCLK, prepare for the next cycle:
   (a) Generate a SIO pulse to acknowledge receipt of the word from the DLP.
   (b) Increment the DMA count register.
   (c) Increment the DMA address counter.
   (d) Clear the DLP SYNCH and the DLP strobe-receive flip-flops.
   (e) Clear the CYCLE flip-flops.
   (f) Repeat as per paragraph 4 above.
6. If (a) "timeout" is true, or (b) the MLI host interface is at a point in the MLI protocol where state machine assistance is requested, or (c) DLP SYNCH is true and DMAOVR/ is "low" indicating that the DLP has changed status, or that the buffer is full, then reset DMARQ and DMAGNT flip-flop. This will cause the DMA operation to cease and will allow the state machine to drive the address and the I/O buses and to receive clocks and to resume its program execution. To restart DMA operation after a timeout condition has occurred, all that is required is to reload the MLI control register $60_{cr}$. This will automatically reset the timeout logic and the DMA sequence will continue where it left off.

DMA Control PROM (FIG. 9A):

The heart of the control logic $60_s$ for the DMA read and DMA write operations is contained within the DMA Control ($60_{sp}$) PROM and for the reason, the programming of that PROM is discussed here. There are five inputs to the PROM: they are SDMARQ=Set DMA request: this term comes high when the following conditions are all met:
   (a) the state machine is in a FETCH cycle.
   (b) timeout is false.
   (c) the DMA Enable bit in the MLI control register is set.
   (d) the MLI host interface is not requesting state machine attention.

DMAOVR/=This term is false unless:
   (a) the DMA Enable bit in the MLI control register is reset, or
   (b) the Expected DLP status does not match the actual received DLP status, or
   (c) the DMA count register overflowed indicating that the upper limit of the memory buffer had been reached.

XMITDTA=This term is true if the data direction is MLI to DLP and false otherwise.

DLPSYNCH=This term goes true on the first leading edge of the clock after a DLP strobe has been received from the DLP.

CYCLE=This term is set and reset by the PROM and is used to synchronize the DMA operations.

The PROM outputs are:

SDMARQ=Set DMA Request flip-flop—this output must be true to enter and remain in DMA mode.

AINCEN=Address Increment Enable-this bit when true and when the DMAGNT flip-flop is set, causes the DMA Count register and the DMA Address register to increment by one on the next leading edge of WTCLK.

SETCYCLE=When true causes the cycle flip-flop to set on the next leading edge of WTCLK.

SETSIO=Causes an SIO pulse to be generated on the next leading edge of STCLK. Also causes the DLPSYNCH and DLP strobe received flip-flops to reset and loads the contents of the Memory Output Bus into the DMA Data latches.

The PROM programming is: (The "+"=OR function; the "."=AND function)

SDMARQ=(SDMARQS.DMAOVR/)+(SDMARQB.XMITDTA.DLPSYNCH/)

AINCEN=(SDMARQB.XMITDTA/.CYCLE/)+(SDMARQB.DMAOVR/.XMITDTA.DLPSYNCH.CYCLE/)

SETCYCLE=(XMITDTA/.DLPSYNCH.CYCLE/)+(SDMARQB.DMAOVR/. .XMITDTA.DLPSYNCH.CYCLE/)

SETSID=(XMITDTA.CYCLE)+(SDMARQB.XMITDTA/.CYCLE)

BACKPLANE INTERFACE

Distribution Card Addressing: There are eight backplane lines used by the Distribution Cards to address any one of eight data link processors (DLPs) or Line Support Processors 300 which are DLP's used for data communications control. Likewise, there are eight backplane lines which are used by the DLP's to indicate a service request to the Distribution Card. These lines are also unique so that only one data link processor can use any given request line. In addition, the lines in both sets are graded in priority. Thus, once the priority of the data link processor is determined within a given base module, that priority request is jumpered for use by the data link processor on the interface board. The corresponding address line is also jumpered.

Maintenance Logic: The Maintenance Card $20_m$ (FIG. 1B) has an addressing capability to address 32 devices within an I/O base module. The high order address line from the maintenance card must be false in order to address a data link processor. The other four address lines encode 1 of 16 lines for data link processor selection. Table A-4 shows the various "maintenance" addressing modes.

TABLE A-4

| Base Local | Address Valid | Address Equal | Comment Comment |
|---|---|---|---|
| 0 | 0 | No | Normal on-line mode |
| 0 | 0 | Yes | Normal on-line mode |
| 0 | 1 | No | Normal on-line mode |
| 0 | 1 | Yes | Local mode |
| 1 | 0 | No | Single pulse only |
| 1 | 0 | Yes | Single pulse only |
| 1 | 1 | No | Halt-stop clock |
| 1 | 1 | Yes | Local mode |

Clock Logic: To minimize clock skew between various boards which comprise the data link processors, the clock is received on each board in a similar manner. Each board receives a clock with one input of a Schottky NAND gate and then drives the clock to the various logic elements with terminated inverting or non-inverting buffers as required.

For maintenance diagnostic purposes, the clock to the data link processor must be inhibited when certain conditions are met. A clock-enable signal is generated on the interface board $105_i$ which is fed to all other boards in the data link processor which received the clock. This signal is gated with the backplane clock in the receiver-named gates on the various boards. The clock to the state machine must also be inhibited when a DMA cycle is in progress. A special state machine clock enable signal is generated on the state machine clock.

Clear Logic: Two clear signals are generated by the clear logic (not shown). One signal causes the DLI interface to clear and to present a clear status to the host computer; the other signal causes all logic in the DLI to clear. The clear signals are PROM-generated, with the inputs and outputs of the PROM fully buffered with the backplane clock edge-triggered registers to prevent unwanted or spurious clear signals from being generated. The PROM is programmed as follows:

TABLE A-5

| | Signal | Comment |
|---|---|---|
| Address Bit | | |
| 0 | MCLR/ | "PUT" to clear register |
| 1 | LOCAL/ | Local Mode |
| 2 | CONNECT/ | DLP Connected to Host |
| 3 | LCLCLR/ | Local Clear |
| 4 | SELCLR/ | Selective Clear |
| 5 | SELMCLR/ | Selective Master Clear |
| 6 | MSTCLR/ | Master Clear |
| 7 | PWRCLR/ | Power-up Clear |
| 8 | CLPMLI | Clear DLP Interface Logic |
| Output Data Bit | | |
| 0 | CLRMLI/ | Clear DLP Interface Logic |

TABLE A-5-continued

| | Signal | Comment |
|---|---|---|
| 1 | CL/ | Clear Whole DLP |
| 2 | CL | Clear Whole DLP |
| 3 | Not Used | |

CI = PWRCLR
+SELCLR.CONNECT
+LCLCLR.LOCAL
CLRMLI = CL
+MSTCLR
+SELMCLR.CONNECT
+CLRMLI.MCLR/

MLI Logic-Data Paths:

The MLI interface logic consists of several major data-paths and functional units as depicted in FIG. 9A.
1. State Machine Address Bus (16)
   The State Machine Address Bus is driven by the MLI logic while in DMA mode. The address is derived from a sixteen bit counter loaded from the I/O Bus via PUT instructions to the DMA address register 160. In DMA mode, the counter automatically increments by one each time a word is transferred on the MLI cable.
2. MLI Data Bus ($105_p$, FIG. 9A)
   While the direction of information transfer is toward MLI (Read), data is gated from the MLI Data bus to the I/O bus when either DMA is active or a "GET" issued to the Read Data Register. When the MLI is driving the data lines, the data is driven either from the Data Register 60 or while in DMA mode, from the State Machine memory output bus (12).
3. The DMA transfer counter $160_{tc}$ is loaded from the I/O bus in complement form when "PUT" is executed. The register is "bumped" each time a word is transferred over the MLI in DMA mode and causes an exit from DMA when it overflows. The contents of the register in complement form are gated onto the I/O bus when a "GET" from the GET MLI Count Register is executed.
4. The interface between the control logic $60_s$ and the State Machine is via a set of GET and PUT registers which receive and drive the I/O bus 10 respectively.

DLI Interface Data Path Logic (FIG. 10A):

The internal data bus 10 of the DLI interface (FIG. 10A) may be driven from three sources: the backplane data lines, the I/O bus and the FIFO output. There are five sinks for the data: the backplane data lines, the I/O bus, the FIFO input register, the MLI counter, and a parity tree circuit $100_t$. The table below describes the source/sink combinations for the various operations performed.

TABLE A-6

| Operation | Source | Sink(s) |
|---|---|---|
| S.M. PUT FIFO | I/O bus | FIFO |
| S.M. GET FIFO | FIFO | I/O bus, parity tree |
| Read (data to host) | FIFO | Backplane |
| Write (data from host) | Backplane | FIFO |
| Send 1st word A of Descriptor | Backplane | Parity tree |
| PUT MLI operation Code | I/O bus | MLI counter |
| Send 1st word of B I/O Descriptor | Backplane | MLI Counter, FIFO |

Notes on DLI Data Path Logic:

When data is to be loaded into the FIFO, it is latched into a register 100$_{i2}$ on the leading DLP clock edge and transferred to the FIFO 100$_{i3}$ on the following half-clock.

All FIFO outputs are inverted. The FIFO is in the path from the inverted backplane bus and the non-inverted I/O bus 10 and also in the return path. All data transfers between the two buses (either direction) must pass through the FIFO.

Although the parity tree is always connected to the internal bus, parity is only checked when (1) data is transferred from the FIFO to the I/O bus or (2) when the 1st word of an I/O descriptor is read and a decision must be made to load or not to load the MLI Counter from the least significant byte of the word.

DLI Interface (FIG. 10A):

The DLI interface control logic 100; consists of a sequential state machine in which the control sequences reside in PROM 100$_{im}$. The 24 latched PROM outputs: (1) drive the MLI interface control signals, (2) control the internal timing and data paths, and (3) provide conditional branching within the PROM code and allow the sequence to follow the MLI protocol.

The PROM 100$_{im}$ contains 1024 words of twenty four bits each and is addressed by ten address lines (A0 through A9). While operating, seven of the address lines (A3 through A9) are routed from the next address lines latched from the PROM outputs. Bits A1 and A2 are generated as "conditional branches" with the conditions selected by the two "branch control" bits. The least significant bit (bit A0) always follows the latched system strobe (STIOL/).

When the State Machine loads a new sequence address by issuing a PUT instruction of the PUT ADDRESS and COUNT register and the conditions are met which allow the UIOSM to change the PROM address, bits A3 through A9 are taken from the I/O bus, bits A1 and A2 are set to zero, and as always, address line A0 follows the latched system strobe.

PROM output Bits:

The function of each of the twenty four bits generated by the PROM 100$_{im}$ are described in the table below:

TABLE A-6

| Bit | Name | Note |
|---|---|---|
| 00 | #STC1 | DLP Status bit #1 |
| 01 | #STC2 | DLP Status bit #2 |
| 02 | #STC4 | DLP Status bit #4 |
| 03 | #STC8 | DLP Status bit #8 |
| | | The DLP status bits are sent to the host when the DLP is connected. They may be read by the State Machine as bits 0, 1, 2, 3 respectively of the DLP interface status register. The functions and values of these bits are defined by the MLI protocol. |
| 04 | #LFIFO | This bit, when STIOL/ is low and DLPSTR/ is low, causes data to be loaded into the FIFO. |
| 05 | #AFIFO | This bit, when STIOL/ is low, causes the output of the FIFO to advance. |
| 06 | #SERREQ | This bit disables the functions described for bit 08, 09, 10; and causes an Interrupt in the State Machine. |
| 07 | #IOSND | Controls the base backplane IOSND/ signal when the DLP is connected and also controls the data paths to receive or transmit. |
| 08 | #PS0 | These bits are used to encode one of seven internal control signals when |
| 09 | #PS1 | |

TABLE A-6-continued

| Bit | Name | |
|---|---|---|
| 10 | #PS2 | the Service Request line (bit 06) is false or to encode special status = for the state machine when Service Request is true. The internal control signals are: |

Internal Control Signals

| | | Comment |
|---|---|---|
| 0 | #SBST | Starts a burst mode operation on the following block |
| 1 | #REQ | Generates a DLP request signal which is sent to a distribution card via the backplane |
| 2 | #ZERO | Disables the drivers onto the backplane data lines generating a "zero" data word. This may be used in some MLI sequences. |
| 3 | #EREQ | Generates an emergency request signal on the backplane. |
| 4 | #FORCEAF | This bit causes the FIFO to advance regardless of the state of STIOL/. |
| 5 | #COUNT | This bit when active causes the counter to increment by 1. This is the means by which the PROM code keeps track of the numbers of MLI data transfers performed. |
| 6 | Load Cntr | This bit causes the counter to be loaded with the least significant eight bits of the internal data bus. This operation is performed when the first word of an I/O descriptor is received which contains the length of the descriptor encoded as a binary number of words in the least significant byte. |
| 7 | None | The value of bits 08, 09, and 10 must be "all ones" when none of the above operations are to be performed. |
| | | Note |
| 11 | #one | This bit causes data bit 00 and the parity bit to be inverted as they are being sent to the backplane data lines. This is required for those MLI protocol sequences which call for "Extended Status" to be transmitted over the MLI. |
| 12 | #DLPSTR | When the DLP is connected, the LCPSTB/ backplane line follows the logical OR of BURST flip-flop and DLP strobe. |
| 13 | #BCNTRL0 | PROM branch control. |
| 14 | #BCNTRL1 | PROM branch control. |

The value of these bits determine how PROM address bits A1 and A2 are generated.

| Bit 13 | Bit 14 | A1 | A2 |
|---|---|---|---|
| 0 | 0 | System Terminate (Inverted) | Counter Overflow |
| 0 | 1 | Next Address Bit #1 (PROM bit 15) | Next Address bit #2 (PROM bit 16) |
| 1 | 0 | System Terminate (Inverted) (Inverted) | Next Address bit #2 (PROM bit 16) |

| Bit | Name | Note |
|---|---|---|
| 15 | #NA1 | Next address bit A1 if bits 13 and 14 are 0, 1 respectively. 16 #NA2 = next address bit A2 if bits 13 and 14 are 0, 1 or 1, 0 respectively. 17-23 = #NA3 through #NA9. These bits provide the next PROM addresses except when a new address is loaded by |

| -continued |
|---|
| the state machine or set by an DLP clear operation from the backplane. |

MESSAGE LEVEL INTERFACE LOGIC 100$_m$: Data transfers between the Network Support Processor (NSP) 80 and any individual Line Support Processor (LSP) 300 are performed by means of a standard MLI logic on the interface circuit 105$_i$. This will be seen in FIGS. 7, 8, 9, and 9A. The data transfers performed may be in either a DMA mode, a non-DMA mode.

In the DMA mode, a DMA address counter 160 is initialized by the MLI state machine 50$_a$ as a "pointer" to the first word in memory to be transferred. At the same time a transfer counter 160$_{tc}$ is initialized by the master State Machine Processor 50$_a$ together with the complement of the number of words to be transferred. DMA logic then handles the data transfer without further intervention by the State Machine Processor 50$_a$. As each word is transferred, the DMA address counter 160 is incremented and the DMA "transfer counter 160$_{tc}$" is decremented. The DMA operation is then normally completed when the DMA "transfer counter" overflows, that is to say, when the value is "0". The DMA logic also terminates DMA mode when an abnormal condition, such as a DMA time-out or an unexpected LASP status signal, is detected.

All direct memory access operations (DMA) are initialized by the MLI State Machine Processor 50$_a$ and are controlled by a DMA control PROM. During DMA operations, the clock to the State Machine Processor is inhibited and the state machine PUT register, the GET register, and the I/O bus are disabled.

NON-DMA MODE: In the mon-DMA mode, data is transferred word-by-word, to the Line Support Processor (LSP) 300 (specifically to the selected LSP 300$_a$, 300$_b$, 300$_c$ or 300$_d$). In this non-DMA mode, the data transfers are performed under the direct control of the MLI State Machine Processor 50$_a$. Data is transferred from the I/O bus 10 to a holding register 60 (FIG. 9) and then via the transmitter-driver 60$_{tx}$ to the connection module 160$_d$ to the addressed line support processor 300.

The message level interface logic circuit 100$_m$ is shown in a block diagram of FIG. 9 and was previously discussed in connection with FIG. 9A.

DATA LINK INTERFACE LOGIC CIRCUIT (DLI): FIG. 10 is a block diagram of the data link interface logic circuitry originally shown in FIG. 8 as circuit 100$_i$. This data link interface logic circuit is the DLI circuit associated with the MLI State Machine Processor 50$_a$ of FIG. 8. In FIG. 10 there is seen a first-in-first-out (FIFO) stack register 100$_{f3}$. This is a 64-word register, each word of which is 16-bits. This register holds data to be transferred to the host computer 100 or else it also holds data which is received from the host computer. The tri-state driver-receiver circuit 100$_{i1}$ sends and receives data to or from computer 100 via the backplane. It also receives data on the internal data bus. Another source of data is memory control card 66$_a$ which has foreplane connections to the tri-state driver-receiver 100$_{i5}$. The tri-state driver-receiver 100$_{i5}$ connects via an internal data bus to a holding register 100$_{f2}$ which provides an input to the FIFO stack register 100$_{f3}$. The output of the FIFO stack register 100$_{f3}$ is fed to an inverter 100$_{i4}$ which provides an output to both tri-state driver-receivers 100$_{i5}$ and 100$_{i1}$.

PROM SEQUENCE: The PROM sequencer 100$_{ps}$ is part of the DLI interface logic of FIG. 10A. This PROM sequencer is designed to relieve the State Machine Processor 50$_a$ from the overhead operations required to perform standard DLI operations which are directed to the host computer system. The logic circuitry in the PROM sequencer is designed to provide and adhere to the standard MLI protocol for host system data transfers. The PROM sequencer receives a starting PROM address from a Start Address register which is initialized by the State Machine Processor. The PROM sequencer then steps through a series of control states to provide control signals which perform the required data transfer operation. Sequencing continues until the PROM sequencer has completed the assigned tasks or until an unexpected condition is detected. The State Machine Processor is notified of the unexpected condition by means of an interrupt signal and a status register signal. The status register defines the cause of the interrupt.

MEMORY CONTROL CARD (MEMCTL)

As previously discussed with respect to FIG. 2, the Network Support Processor 80 holds the memory control cards 66$_a$ and 66$_b$; and each of these control cards is respectively associated with the master 50$_a$ and 50$_b$ 50$_a$, 50$_b$ State Machine (50$_a$, 50$_b$) processors within the Network Support Processor. A block diagram of the basic elements of the memory control card 66 is shown in FIG. 11. The element 66$_a$ is the memory control for the master processor 50$_a$ while the element 66$_b$ is the memory control for the slave processor 50$_b$.

As seen in FIG. 11, the memory control card 66 provides a Local Memory of 8K words. This Local Memory is for exclusive use by its associated State Machine Processor, that is, to say, memory control card 66$_a$ is for exclusive use of the MLI processor 50$_a$, while the memory control card 66$_b$ is exclusively for use of the NDL processor 50$_b$. The memory control card 66 which is the generalized layout for the memory control and which also includes logic circuitry that allows the particular state machine processor to address up to 132K words of Shared Memory 90. The actual Shared Memory that is allowed in the Network Support Processor 80 is limited to 115K words by the constraints of the NSP software. Communications with other cards in the Network Support Processor is conducted via the foreplane connectors shown in FIG. 1B.

The use of maintenance card signals (PRIF, DSIM, MAINT. SEL) shown in FIG. 11, have been discussed in the cited reference patents which have been included herein by reference.

As seen in FIG. 11, the memory control cards in each case are the same except that the MLI memory control card 66$_a$ has an added module select logic circuit shown surrounded by the broken line.

The module select logic shown within the dotted line of the memory control card (66$_a$) only is necessary because one of the state machine cards is the master processor (50$_a$) while the other state machine, the NDL processor 50$_b$, is the slave processor. Thus, the module select logic differentiates the master processor card from the slave processor card and selects when each card will be able to use the Shared Memory 90, should both 50$_a$ and 50$_b$ simultaneously try to access the same memory card in memory 90.

The memory address bus 16 from the State Machine Processor $50_a$ carries address data to arithmetic logic unit $66_u$ and to the Local Memory $66_m$ and also to an address select register $66_s$ which has an output conveyed to the Base Address Register $66_r$ whose data output is fed to the ALU $66_u$. The ALU $66_u$ provides a combined memory address which is sent to Shared Memory 90 for data access. Simulated test signals from the maintenance card $20_m$ (FIG. 1B) may also be gated into the ALU $66_u$ and the Local Memory $66_m$.

The I/O bus 10 can convey data into the Base Address Register $66_r$, into the Local Memory $66_m$ and onto the data bus $10_{db}$.

LOCAL MEMORY: The Local Memory $66_m$ (FIG. 11) of the memory control card 66 provides 8,192 17-bit words of RAM for the particular state machine processor associated with that card. This RAM memory receives address information from the memory address bus 16 and also input data from the I/O bus 10. The data output from the local memory $66_m$ is through the common memory data-out bus, MEMOUT 12.

SHARED MEMORY CONTROL: The Shared Memory "control" section of the memory control card 66 has circuits which permit the expansion of the addressing capability of the state machine processor to 131K words. Logic circuits consist of a MAP generator PROM (not shown) and 16 base address registers (BAR) $66_r$ and a 17-bit arithmetic logic unit (ALU) $66_u$.

The MAP generator is a 32-by-8 PROM that decodes the most significant 4-bits of the memory address on bus 16. This decoding determines whether or not the Shared Memory 90 is to be addressed.

The Base Address Register (BAR) $66_r$ is evenly divided into two groups of 8 BARs. Thus there are 16 of these base address registers. One group of these (BAR0-BAR7) is used when the Shared Memory 90 is being addressed by the state machine program counter 41; FIG. 4. The other group of Base Address Registers (BAR8-BAR15) is used when the Shared Memory is being addressed by the memory reference register (MRR) 40, FIG. 4, of the state machine processor.

Any one of the Base Address Registers $66_r$ are loaded through the I/O foreplane bus 10 by the software and they point to a base address that encompasses a 4K area in Shared Memory 90. A Base Address Register output to the ALU $66_u$ is selected by decoding the state machine memory address bus control line 16. This decoding selects one group of 8 Base Address Registers. By decoding the three high-order memory addresses (14:03), one of the 8 Base Address Registers in that particular group is selected.

ARITHMETIC LOGIC UNIT (ALU): The ALU $66_u$ of the memory control card 66 of FIG. 11 is a 17-bit adder. The A-inputs are derived from a Base Address Register and the B-inputs are derived from the memory bus 16. The data outputs are applied to the Shared Memory address bus (XMADR). The 16-bit Base Address Registers will furnish 14-bits (15:14) to bit positions 16:14 of the arithmetic logic unit A-input. Bit positions 0 and 1 are grounded. The 16-bit memory address bus (MADDR) 16 furnishes 12-bits (11:12) to bit positions 11:12 of the arithmetic logic unit B-input. The bit positions 16:05 are grounded. The ALU output, which is the sum of the most significant 14-bits of a selected Base Address Register and the least significant 12-bits of the memory address bus 16, is a 17-bit Shared Memory address XMADR that selects one of 115K words.

MEMORY CONTROL WAIT LOGIC: Under certain conditions, the memory control cards 66 will generate a WAIT signal that stop the associated state machine clock connected with that memory control card. This clock is stopped as long as the WAIT signal is "active". One of the WAIT conditions occurs when the memory control card 66 is writing into, or reading from, the Shared Memory 90. The memory control card will insert the appropriate WAIT signal to provide the appropriate delay since the Shared Memory may be too slow to keep up with the faster action of the State Machine Processor and the memory control card.

Another condition occurs when both of the memory control cards $66_a$ and $66_b$, attempt a simultaneous access to the same Shared Memory card 90. A priority generator (PRIGEN) PROM, or the MLI memory control card $66_a$ will resolve the contention and cause the appropriate WAIT states to be generated.

A third condition occurs when the State Machine Processor detects a memory parity error. A WAIT signal resulting from a memory parity error is "ungated", that is, to say, it is not passed through. The WAIT signal causes the state machine clock to remain stopped until the state machine is clear.

RAM CARDS

As seen in FIG. 12 a schematic diagram is shown of the shared memory RAM cards, circuitry designated as 90 on FIG. 1B.

Each of the cards has a 32KB capacity for use as contribution to the Shared Memory 90. The entire memory capacity of RAM 90 is shared by the 2 State Machines $50_a$ (MLI) and $50_b$ (NDL). As seen in FIG. 1B, this capacity may be provided by anywhere from 4 to 7 RAM cards.

One particular unit of the Shared Memory RAM cards is unique in that it has termination resistors for the Shared Memory address lines and for the memory-out (MEMOUT) bus. This particular card is called a RAM termination card and designated 32KB RAM TER. The termination RAM card must be located at the end of the memory buses in the Network Support Processor.

The RAM card contains 68 4096-by-1 RAM chips. Each card has one data and one addressing port (FIG. 12) connected to the MLI memory control card $66_a$. A second data and addressing port on the RAM card is connected to the NDL memory control card $66_b$. This allows the Shared Memory to be accessed by either the master $50_a$ or the slave $50_b$ State Machine Processor. Communication with the memory control cards is done through a foreplane connector.

As seen in FIG. 12 the addresses from the memory control cards of the MLI state machine and the NDL state machine, respectively enter the B port $90_{ab}$ and the A port $90_{aa}$ and are thence connected to the address input of a RAM card such as $90_1$. The data from the first and second State Machine (master $50_a$ and slave $50_b$) on the incoming data phase, are conveyed to ports $B_{d1}$ and $A_{d1}$ from which they are conveyed to data input DI at the data input of card $90_1$. The data output (DO) of the RAM card $90_1$ is fed into port $B_{d2}$ and $A_{d2}$ from whence they are respectively conveyed on the data lines to the MLI state machine memory control $66_a$ and NDL state machine memory control $66_b$.

FUNCTIONAL ASPECTS OF THE NETWORK SUPPORT PROCESSOR

Integration of the various functions of the Network Support Processor is accomplished through the use of buses and consists of three basic links as will be seen in FIG. 13. These links consists of the MLI link, the NDL link, and the INTER link. These links make it possible for the combination of cards, which constitute the Network Support Processor, to work in an integrated fashion as a total unit.

The Network Support Processor (NSP) 80 is essentially a multi-processor unit computer. One processor (designated as the MLI processor controller) consists of a MLI state machine $50_a$ working with a MLI memory control card $66_a$. and an Interface Card $105_i$, as indicated in FIG. 2.

The second unit (designated as the NDL processor controller $50_b$) consists of the NDL state machine $50_b$ working with the NDL memory control $66_b$. Both of these processors-controllers are structured in the same manner and both can access Shared Memory 90.

The three primary buses that carry information and addresses among the various cards (FIG. 13) are the I/O bus 10, the Memory Address (MADDR) bus 16 and the memory data-out bus (MEMOUT) 12. Further, additional control information is passed among the cards of each controller by means of the foreplane connectors (shown in FIG. 1B).

As seen in FIG. 13, the MLI link connects the three units ($105_i$, $66_a$, $50_a$) of the MLI processor controller. It also provides connection between the MLI controller and the Shared Memory 90. The NDL link connects units $66_b$ and $50_b$. The INTER link connects Shared Memory 90 to $66_a$ and $66_b$.

INPUT/OUTPUT (I/O) BUS: The I/O bus $10_a$ is a common data bus that connects the three cards of the MLI controller. The information on this bus involves the following:

(a) control information from the MLI state machine $50_a$ to the interface unit, $105_i$.

(b) control information from the state machine $50_a$ to MLI memory control card, $66_a$.

(c) status information from the interface unit to the state machine.

(d) data received from the host computer 100 on the DLI which is stored in the interface FIFO register (FIG. 10) and then sent to either the state machine or to Memory 90.

(e) data from either the state machine or memory is sent to the interface unit $105_i$ for storing in FIFO register for subsequent transmission to the host computer over the DLI.

(f) data received from the LSP 300 on the MLI and sent to either the state machine, or to Memory 90 in a non-DMA mode, or to Memory 90 in a DMA mode.

(g) data from either the State Machine $50_a$ or from Memory 90 which is sent to the Interface unit $105_i$ in the non-DMA mode for transmission to the Line Support Processor 300 on the MLI.

(h) data from the State Machine $50_a$ to be written in Local $66_m$ or into Shared Memory 90.

MEMORY ADDRESS (MADDR) BUS: The Memory Address Bus $16_a$ is a common address bus that connects the three controller units for the MLI controller which consists of units $50_a$, $66_a$ and $105_i$. The following information is conveyed on the Memory Address Bus $16_a$:

(a) The program counter 41' outputs (or the memory reference register 40 outputs) of the State Machine when addressing: PROM circuitry on the State Machine $50_a$, or Local Memory $66_m$ on the memory control card $66_a$.

(b) The DMA address register (FIG. 9) on the interface unit $105_i$ which is used for addressing Local Memory $66_m$ on the memory control card (MEMCTL) 66.

(c) The program counter 41' output, the State Machine MRR 40 output, or the DMA address register 160 on the MLI interface (FIG. 9) for addressing the Base Address Register (BAR $66_r$) and for addressing the module select logic (FIG. 11) on the memory control card $66_a$ in order to address Shared Memory 90. The module select logic on FIG. 11 is used to determine whether card $50_a$ or $50_b$ will get access to Memory 90 in any given period.

The Memory Address Bus $16_b$ is used as a common address bus that connects the NDL controller (state machine $50_b$ and memory control $66_b$). Here the following information data is transferred on the memory address bus:

(a) The program counter 41' output (or the MRR 40 output) of the NDL state machine $50_b$-outputs which are used for addressing the NDL PROM 50 or for addressing Local Memory $66_m$ on the memory control card $66_b$.

(b) The program counter 41' output (or the MRR 40 output) of the NDL state machine which transfers information to the Base Address Register, BAR $66_r$ (FIG. 11) and the logic on the memory control card $66_b$ in order to address Shared Memory 90.

MEMORY OUTPUT BUS (MEMOUT): The Memory Output Bus $12_a$ is a common data bus that connects the three units ($50_a$, $66_a$, $105_i$) of the MLI controller. Information on this bus consists of the following:

(a) The output of the Local Memory $66_m$ on the memory control card $66_a$ to either the state machine $50_a$ (for program information or data) or to the DMA register $60_m$ (FIG. 9) on the interface unit $105_i$ for transmission of data to the Line Support Processors (LSPs) over the message level interface.

(b) The output of Shared Memory 90 over to the state machine $50_a$ or to the Interface Card $105_i$ and LSP 300.

(c) The output of Local Memory $66_m$ on the memory control unit $66_a$ which transfers either program information or data to the MLI state machine, $50_a$.

(d) The output of the Shared Memory 90 which transfers information to the NDL state machine, $50_b$.

Likewise, MEMOUT bus $12_b$ provides similar functions for the NDL state machine $50_b$ (FIG. 13).

SHARED MEMORY INTERFACE: The MLI memory control card $66_a$ sums the memory address (MADDR) together with the output of a Base Address Register (BAR) in order to generate a Shared Memory address for use to select a Shared Memory word in Memory 90. This MEMCTL card $66_a$ also handles a bi-directional shared memory data bus $10_a$ that transfers write-data over to Shared Memory 90 and returns read-data from the Shared Memory 90. Write-data is provided by the I/O bus $10_a$ of the MLI link. Read-data is transferred through an isolator on to the memory out bus $12_a$ of the MLI link, FIG. 13.

The NDL memory control $66_b$ sums the memory address together with the output of a Base Address Register (BAR) which is loaded to generate a shared-memory address that selects a memory word from Memory 90. The memory control $66_b$ also handles a bi-directional shared memory data bus that transfers Write data over to Shared Memory 90 and returns Read data from Shared Memory 90. Write-data is provided by the I/O bus $10_b$ of the NDL Link. Read-data is transferred through an isolator on to the memory out bus $12_b$ of the NDL Link.

NDL LINK: The NDL Link shown in FIG. 13 connects the two units of the NDL controller which consist of $50_b$ and $66_b$. This Link also provides a connection between the NDL controller and the Shared Memory 90.

NSP INTERLINK: The only "data" communication between the MLI controller (units $50_a$, $66_a$) and the NDL controller (units $50_b$ and $66_b$) is through the Shared Memory 90.

The MLI controller communicates with Shared Memory 90 through a shared memory interface within the MLI Link. The MLI Link, illustrated in FIG. 13, connects the master processor and memory of the MLI controller and also connects the MLI controller with the shared memory 90 and interface unit $105_i$. Similarly, the NDL controller communicates with shared memory 90 and the MLI controller. Each RAM card (FIG. 12), in Shared Memory 90, has a separte port and its own port selection logic circuits for each of two (MLI and NDL) shared memory interfaces.

The port selection logic, FIG. 12, is controlled by signals generated on the MLI memory control card $66_a$. Control flags (FIG. 13) are passed between the two memory control cards $66_a$ and $66_b$ in order to control access to Memory 90. These flags cause the MLI Link port to be selected when the MLI controller requires access to Shared Memory 90. Otherwise, the NDL link port is activated.

The same RAM card 90 cannot be accessed simultaneously by both the MLI controller and the NDL controller. Simultaneous access is prevented by the logic circuits on the MLI memory control card $66_a$. However, two different RAM cards in the Shared Memory 90 can be simultaneously accessed by the MLI and NDL controllers as long as it is not the same RAM card which is trying to be accessed at the same time.

STATE MACHINE EXTERNAL INTERRUPTS

A State Machine Processor, as discussed in FIGS. 3, 4, 5 and 6, operates in either a "foreground" or "background" mode. Foreground mode is used for normal operations and can be interrupted by a signal from the interface unit $105_i$. Background mode is used when the State Machine services "external" interrupts. While in background mode, the State Machine cannot be interrupted again until it is first returned to the foreground mode by the program.

The logic circuitry that handles the two modes consists (of 16 accumulators of which eight accumulators are assigned to each mode); a flag register assigned to each mode; and one MRR-save register 47 that retains the contents of the MRR 40 when the State Machine switches from foreground to background mode. As seen in FIG. 14 the foreground accumulators are indicated as $30_f$ while the background accumulators are $30_b$.

The foreground flag register is designated 35 while the background flag register is 36 and the MRR-save register is designated as 47.

When a State Machine, which is operating in the "foreground" mode, detects an interrupt, the status of the State Machine is saved. First, the contents of the program counter PC 41' are saved in the stack memory 45'; second, the program counter 41 is loaded with an address furnished by the source of the interrupt (interface unit $105_i$); third, the foreground accumulators $30_f$ are disabled and the background accumulators $30_b$ are enabled; fourth, the foreground flag register 35 is disabled, and the background flag register 36 is enabled; and fifth, the MRR 40 data is stored in the MRR-save register 47 (FIG. 14).

Thus, the pre-interrupt-status of the State Machine is stored, without alteration, for future use. The State Machine is then able to perform an interrupt service routine. The State Machine status is restored by reversing the status-save procedure after the interrupt service is completed. The firmware routine that was in process when the external interrupt was detected, resumes execution at the point where the interrupt occurred.

In a Network Support Processor (NSP), only the MLI state machine $50_a$ can be interrupted. The interrupt is generated on the interface unit $105_i$. An interrupt occurs when the PROM sequencer $100_{ps}$ reaches a point where it requires State Machine assistance in order to determine the next step. This point includes the complete transmission of a message to the host computer 100 and the complete receipt of a message from the host computer.

The interface unit $105_i$ forces the MLI state machine to the address 0002. This address holds a branch to the interrupt servicing routine. Among the first instructions in this routine are instructions to fetch the contents of the interface unit status register 200, FIG. 14. This information is used to determine the appropriate response to the interrupt signal.

The two flag registers 35, 36 are 7-bit registers on the State Machine that determine whether to perform conditional branch operations and execute a conditional call or a conditional return; or whether to call a subroutine or to return from a subroutine.

There are two sets of bits in the flag registers. One set of three bits are "external" flags. This set is used to accept data that is external to the card. The second set consists of four bits. This set holds the state of the ALU output after the last arithmetic operation. These bits record whether or not the entire ALU output is zero (the state of the most significant and least significant ALU output bits) and the state of the ALU "carry" output.

The State Machine has a background-foreground control flip-flop $23_m$ (FIG. 14) that selects the operational mode. This flip-flop is automatically set to the foreground mode when the NSP is initiated. It is set to the background mode by an external interrupt. As long as the flip-flop remains in the background mode, no further interrupts are acknowledged. This flip-flop is reset to foreground mode at the conclusion of the interrupt servicing routine. New interrupts are then accepted.

The State Machine acknowledges two program-interrupt instructions:

(1) An instruction for interrupt disable
(2) An instruction for interrupt detect enable The instructions do not depend on the existence of external interrupt. Interrupt instructions protect certain areas of the program from external interruption. In FIG. 14 there is shown the NSP interrupt logic where the PROM sequencer $100_{ps}$ is initiated by a start address from a PUT instruction.

MEMORY ADDRESSING: As seen in FIG. 15, a block diagram of the Network Support Processor illustrates the major elements of the NSP 80 indicating the MLI processor controller ($50_a$, $66_a$) and also the NDL processor controller ($50_b$, $66_b$) each of which connect to a commonly Shared Memory 90.

There are three distinct types of memory in the Network Support Processor as follows:

(a) Each state machine processor has a PROM that holds part of the State Machine program. In FIG. 15 the MLI State Machine $50_a$ is seen having its 8K PROM $50_m$ for storage of its program; likewise, the NDL State Machine $50_b$ is seen to have its PROM $50_n$ for storage of its program with 2K words.

(b) Each memory control (MEMCTL) card contains part of the State Machine program and also a Local Memory for each of the State Machines. For example, in FIG. 15, the MLI memory control $66_a$ is seen to have a 16K word RAM $66_m$ for its Local Memory; likewise, the NDL memory control $66_b$ has its own local memory $66_n$ which includes a 16K RAM; further, each memory control card in FIG. 15 also includes a PROM which contains part of the State Machine program and which is part of the Local Memory $66_m$.

(c) The Memory 90 of FIG. 15 (also seen in FIG. 1B) is a series of RAM cards, each of which has a 32 kilobyte capacity. These RAM cards can hold part of the program for both of the master and slave state machines and they provide a Shared Memory 90 which can be accessed by either of the State Machines by means of their associated memory control cards.

The State Machines can have as many as 16K program words in PROM memory. In the preferred embodiment the MLI State Machine $50_a$ has 8K program words and the NDL State Machine $50_b$ has 2K words of program. Each memory control card has 8K words of Local Memory available to its associated State Machine. The number of words in Shared Memory 90 will vary with the number of RAM cards installed in the Network Support Processor seen in FIG. 1B. The Shared Memory is addressed by either of the state machines.

As an example of the preferred embodiment seen in FIG. 1B, if there are 4 RAM cards, then the shared memory provides 65,536 words and 131,072 bytes; if there are 5 RAM cards then the shared memory includes 81,920 words and 163,840 bytes; with 6 RAM cards the shared memory is 98,304 words and 196,608 bytes; with 7 RAM cards the shared memory is 114,688 words and 229,376 bytes.

PROM AND LOCAL MEMORY: The PROM memory and Local RAM are divided into blocks of 4K words for addressing purposes. The PROM is divided into 4 addressable blocks: PROM 0, PROM 1, PROM 2, PROM 3. Not all of the PROM address blocks are used. Local RAM is divided into two addressable blocks; the RAM 0-4K and RAM 4-8K.

The PROM or the Local RAM is directly addressed by the 16-bits from the memory address MADDR bus 16. The foremost significant bits on the memory address bus (15:4) are used to select a 4K word block. Then a word within that block is selected by the 12 least significant bits (11:12).

SHARED MEMORY ADDRESSING: The 16-bits (on the memory address bus) MDDR 16 address a maximum of 64K words. Since the network support processor 80 has up to 162K words of memory, then a method of expanding the basic address range is required.

In FIG. 11 the memory control card is shown to have a logic circuit ($66_s$, $66_r$, $66_u$) for the conversion of the 16-bit memory address into a 17-bit "shared memory" address. This logic circuit consists of 16 Base Address Registers (BAR $66_r$) and also a 17-bit arithmetic logic unit ALU $66_u$. The BAR $66_r$ is pre-loaded by software with a base address that is applied to the A-input of the ALU $66_u$. The least significant 12-bits of the memory address bus MADDR 16 are applied to the B-input. The two values are summed together in the ALU in order to provide 17-bit address to Shared Memory 90. Fourteen of the Base Address Registers (BAR) are used and can be pre-loaded by software during a base address operation. The BAR can address all areas of shared memory. This is done, however, with two addressing restrictions:

(a) The base address which is loaded into the BAR must be modulus four since the two least significant BAR inputs to the ALU are forced to be LOW.

(b) The base address must point to a 4K memory block within the constraints of the installed Shared Memory 90.

Since the ALU $66_u$ is 17-bits wide and the BAR is 16-bits wide, the BAR input to the ALU must be offset by 1-bit. In other words BAR bit 15 is applied to the ALU bit 16. As a result of this offset, the Shared Memory base address is two times the absolute value held in the BAR. The extra bit (bit-0) to the ALU is grounded. Bit-1 from the BAR to the ALU is also grounded in order to prevent timing problems on the shared memory boards.

The Base Address Register (BAR) of the memory control (FIG. 11) is loaded by means of the I/O bus 10 from the State Machine by a PUT STROBE 1 instruction. As an example of this, the following PUT instruction is illustrative:

PUT XVVV XXOO nnn nnn nnn nnOO

Where:
   the X-bits are "do not care" bits;
   the V-bits are used to select one of the 16 BAR's;
   the n-bits are the data bits which are loaded in the BAR.

A particular Base Address Register BAR ($66_r$) is selected for addressing by a combination of bits (15:04) of the memory address bus 16 and the MRR 40, FIG. 4, output enable signal. When the memory address is derived from the program counter, PC 41', FIG. 4, the MRR output enable signal (MRROE) is "false" and the bit selection is that of BAR 0 through BAR 7.

When the memory address is derived from the MRR 40 (FIG. 4), the MRR output enable signal is "true" and the bit selection is then BAR 8 through BAR 15. The following Table I indicates the Base Address Register selection as a function of the program counter 41' and memory address bits 15:04.

TABLE I

| Program Counter Addressing | | | | |
|---|---|---|---|---|
| MADDR (15:4) | | | | |
| 15 | 14 | 13 | 12 | BAR Selected |
| 0 | 1 | 1 | 1 | 07 |
| 1 | 0 | 0 | 0 | 00 |
| 1 | 0 | 0 | 1 | 01 |
| 1 | 0 | 1 | 0 | 02 |
| 1 | 0 | 1 | 1 | 03 |
| 1 | 1 | 0 | 0 | 04 |
| 1 | 1 | 0 | 1 | 05 |
| 1 | 1 | 1 | 1 | 07 |

Note:
BAR six is not used.

The following Table II indicates the Base Address Register selection as a function of MRR 40.

TABLE II

| Memory Reference Addressing | | | | |
|---|---|---|---|---|
| MADR | | | | |
| 15 | 14 | 13 | 12 | BAR Selected |
| 0 | 1 | 1 | 1 | 15 |
| 1 | 0 | 0 | 0 | 08 |
| 1 | 0 | 0 | 1 | 09 |
| 1 | 0 | 1 | 0 | 10 |
| 1 | 0 | 1 | 1 | 11 |
| 1 | 1 | 0 | 0 | 12 |
| 1 | 1 | 0 | 1 | 13 |
| 1 | 1 | 1 | 1 | 15 |

Note:
BAR fourteen is not used.

The 17 address bits apply to the Shared Memory 90 are divided into three groups. One group (16:03) is used to select one of eight possible RAM cards. A second group (13:12) is used to select one of the 4K word blocks within the selected page. The third group (01:02) is used to select one of the four pages on the selected card.

PROGRAM ADDRESSING: A program PROM 50, situated on each State Machine, holds the first 16K of memory addresses. However, only that portion of the PROM that includes program information is addressed directly by either the program counter, PC 41', or the memory reference register, MRR 40. As previously noted, the MLI State Machine has 8K words of PROM while the NDL State Machine has 2K words of PROM in the preferred embodiment of the Network Support Processor.

FUNCTIONAL DESCRIPTION

It is the "firmware" that provides data communication capability to the Network Support Processor (NSP). The "firmware" refers to the instructions that are stored in the program PROM 50; firmware may be considered analogous to "software in a hardware form". Stored instructions allow the hardware to perform as a front-end communications processor.

Within the host computer 100, the NSP communications are handled by a MCP (master control program) routine which is known as DCC or Data Communications Control. A separate host computer DCC routine exists for each and every NSP in the data communications subsystem, which is designated as IODC or Input Output Data Communications Subsystem. The DCC initiates messages to the Network Support Processor (NSP) and receives messages back from the NSP. A "message" is a block of information followed by a longitudinal parity word (LPW) that checks the validity of the message contents.

Communications are conducted by means of messages that are called "requests" and "results". The messages (shown in Table III) are appended as the data component of the I/O Descriptor Word. A request message is sent from the host computer 100 to the NSP when a SEND message I/O Descriptor is initiated. A result message is sent from the NSP to the host computer when a GET message I/O Descriptor is initiated. In both message cases, a Result Descriptor that describes the result of a particular I/O operation, is sent from the NSP over to the host computer. The Result Descriptor is not the same as the "Result Message" as is seen in Table III.

TABLE III

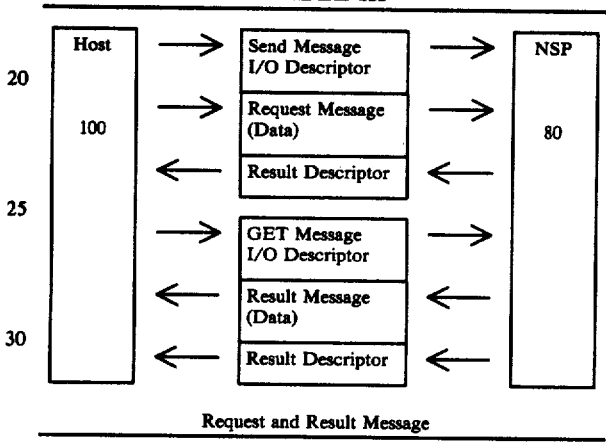

Request and Result Message

The host computer and the Network Support Processor (NSP) use eight different message types as shown in Table IV.

TABLE IV

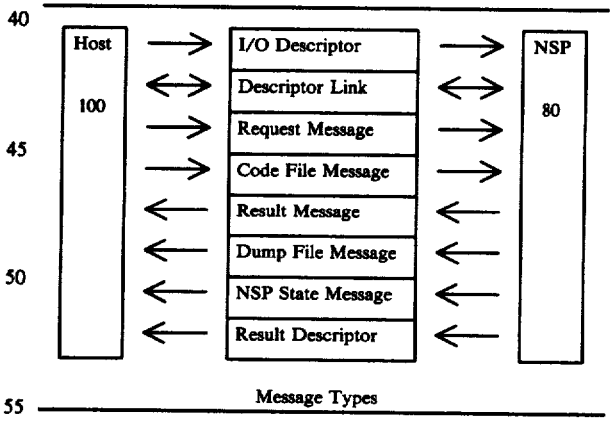

Message Types

An I/O Descriptor is a command from the host computer 100 that requires the NSP 80 to perform a certain operation. This command is followed by a Descriptor Link (D/L) that is used as a "job identifier". The job identifier is returned to the host computer at the start of every period during which information was transferred as a result of the I/O Descriptor that the Descriptor Link initially accompanied. A Result Descriptor is a message that describes the results of the I/O Descriptor execution cycle. Result Descriptors, Descriptor Links and I/O Descriptors have been discussed and explained in the priorly cited patents incorporated by reference.

The remaining 5 message types are the data transfers that are performed in response to the various type of I/O Descriptors.

There are three specialized message types designated:
1. CODE FILE;
2. DUMP FILE;
3. NSP STATE.

The Code File message transfers the firmware data from the host computer to the Network Support Processor. A Dump File message is used to dump portions of the NSP memory back to the host computer. The NSP State message is used to report the current condition of the Network Support Processor to the host computer.

All the remaining messages are either "request" or "result" messages. The valid messages are shown and listed in Tables V and VI. In the Tables, the unlisted message codes are not used. Request messages are sent as the data portion of a SEND message operation. Result messages are returned to the host computer as the data portion of a GET message operation.

The ADD GROUP message adds a group to the subsystem. A group is a collection of station sets. A station set is defined as a set of stations that are jointly and physically acceptable. Each station is associated with only one station set. Each station set is associated with only one group. Thus, when a group is added to the subsystem, the entire collection of station sets and the stations in each station set is added to the system.

TABLE V

| Code | Message Type | Meaning |
|---|---|---|
| | | Request Messages |
| 01 | Add Controller | Adds Line Control Process code file to subsystem |
| 02 | Delete Controller | Removes Line Control Process after process no longer in use |
| 03 | Add Editor | Adds Editor code file to subsystem |
| 04 | Delete Editor | Remover Editor from subsystem after Editor no longer is use |
| 05 | Add Group | Adds group to subsystem |
| 06 | Delete Group | Removes group, associated stationsets, stations, and lines from subsystem |
| 07 | Add Line | Adds line to subsystem and activates Line Control Process for line |
| 08 | Delete Line | Removes line from subsystem |
| 09 | Add Station | Adds station to subsystem after corresponding stationset added |
| 0A | Delete Station | Removes station from subsystem after station no longer in use |
| 0B | Add Stationset | Adds stationset to subsystem after corresponding group added |
| 0C | Delete Stationset | Removes stationset and associated stations form subsystem after each station no longer in use; stationset removed after all stations removed |
| 0D | Add Translate Table | Adds translate table to subsystem |
| 0E | Delete Translate Table | Removes translate table after table no longer in use |
| 0F | Clear Adapter | Soft clears line adapter firmware |
| 10 | Dump Adapter | Dumps line data area in line adapter |
| 11 | Initialize Adapter | Initializes line adapter |
| 12 | Test Adapter | Tests state of line adapter |
| 13 | Ack Station | Acknowledges receipt of station input result message |
| 14 | Change Station Editor | Changes station Editor to Editor loaded in NSF by previous Add Editor request message |
| 15 | Make Station Not Ready | Makes a station NOT READY in firmware |
| 16 | Make Station Ready | Makes a station READY in firmware |
| 17 | Output | Sends output message to station |
| 18 | Clear LSP | Sends selective CLEAR to LSP controlled by NSP |
| 19 | Set Attribute | Sets value of certain parameters in specified line, station, or stationset |
| 1A | Set External | Sets value of specified station or line external variables |
| 1B | Set Global | Sets value of certain global Executive variables |
| 1C | Status | Requests either global Executive status information or the values of certain characterisitcs of a specified Line Control Process, Editor, group, stationset, station, translate-table, or line |

TABLE VI

| Code | Message Type | Meaning |
|---|---|---|
| | | Result Messages |
| 01 | Cleared Station | Station has been cleared |
| 02 | Error | Unsuccessful attempt to receive from or transmit to station |
| 03 | Input | Returns input message received from station |
| 04 | Message Edit Error | Returns information about abnormal termination in Editor activation for station |
| 05 | Output Status | Acknowledges output request for station when required |
| 06 | Purged Output | Output request for station purged because station is cleared |
| 07 | Unprocessed Output | Output request for station discarded because station is cleared |
| 0F | Line Suspended | Main Line Control Process suspended |
| 10 | Line EOT | Main Line Control Process terminated normally |
| 11 | Dump Adapter Reply | Returns line adapter data information for line in response to Dump Adapter message |
| 12 | Test Adapter Reply | Returns status information for line in response to Test Adapter message |
| 13 | Switched Line Change | Returns information about changes in status of switched line |
| 14 | Abnormal Termination | NSP or LSP S-Process terminated abnormally |
| 15 | Ack Request | Request processed normally |
| 16 | Rejected Request | Request rejected due to invalid information or precondition not satisfied |
| 17 | Deleted | Line control process, Editor, group stationset, station, translate-table, or line deleted as requested |
| 18 | Status Reply | Returns status information in response to status request |
| 19 | Unsuccessful I/O | Returns information associated with an unsuccessful I/O attempt |

NOTE
An asterisk in the F column indicates that the result message applies only to firmware, not to hardware.

Within the network support processor 80 of FIG. 17, several firmware components jointly insure communications with the host computer and the Line Support Processors (LSPs). These firmware components can be classified as follows:
  (a) Manager
  (b) Host Dependent Port (HDP) Control
  (c) Executive
  (d) Editor
  (e) Line Control Process The host computer message level interface 15 in FIG. 1A (MLI) is used for communications between the host computer and the Network Support Processor (NSP) while the Network Support Processor message level interface $100_m$ (MLI) is used for communication between the Network Support Processor and the Line Support Processor (LSP). In FIG. 16 there is shown how the separate firmware components are used in transferring information between the Line Support Processor, the Network Support Processor and the host computer.

In FIG. 17 there is shown a firmware block diagram which illustrates where the different components are located and their relative size.

In the message transfer block diagram of FIG. 16 the Line Support Processor 300 is connected to the Network Support Processor 80 via the message level interface $100_m$. The NSP 80 is shown with the Executive firmware $80_{ex}$, the Line Control Process firmware $80_{lcp}$, and the Editor $80_{ed}$. NSP 80 connects through the host DLI, $100_i$, FIG. 16, over to the host computer 100, which includes a firmware DCC (Data Comm Control).

The firmware block diagram of FIG. 17 shows the Network Support Processor 80 as composed of two controllers, that is the MLI controller and the NDL controller. Both of these controllers share the Memory 90. The NDL controller has a 2K PROM on the state machine designated Bootstrap $80_b$, and also a 32K RAM designated as Operating System Kernel $80_k$.

The MLI controller has an 8K PROM designated as Manager $80_m$ and also a 32K RAM designated HDP control $80_h$. The Manager $80_m$ connects via the MLI 15 to the host computer 100. The HDP control $80_h$ connects via MLI $100_m$ to the Line Support Processor, LSP 300.

MANAGER: The Manager (FIG. 17) is a software module that controls communication between the NSP and the host computer across the message level interface MLI 15. It has control of the MLI and performs the I/O operations. The majority of the firmware code $80_m$ is held in 8K words of the MLI state machine PROM memory designated 50, FIG. 3.

HDP CONTROL: The HDP Control (FIG. 17) drives a Network Support Processor and message level interface and provides an interface to the Executive $80_{ex}$. Firmware for the HDP Control is resident in the RAM portion of the memory ($66_m$) control unit associated with a particular state machine.

EXECUTIVE: The Executive (FIG. 16) is a software module that performs most of the NSP data communication functions. It processes all the request messages from the host computer except for the OUTPUT Request Message. This particular message is passed on to the Line Control Process unit $80_{lcp}$. When the host computer requests a status result, the Executive returns an OUTPUT STATUS Result Message after the OUTPUT request is completed. The Executive sends Result messages to the host computer in response to both previously received Request messages and spontaneous subsystem events.

The components that make up the Executive $80_{ex}$ can be broadly classified as the Permanent Independent Runners, Interpreter, S-Processes, and the Operating System.

The firmware code for the Executive $80_{ex}$ resides in the RAM $66_n$, FIG. 15, of the NDL memory control unit $66_b$ and also in a portion of Shared Memory 90. The remainder of the Shared Memory is dynamically allocated and de-allocated, as the activity in the network demands.

PERMANENT INDEPENDENT RUNNERS: The Permanent Independent Runners perform the handler functions for the NSP 80. These functions are independent of network configurations and station types. The code for the Independent Runners is loaded during initialization and exists in fixed locations of the Shared Memory 90. There are three Permanent Independent Runners which are:
 (a) The HDP Handler
 (b) Request Handler
 (c) The Status Handler The function of each Handler is summarized as follows:

HDP HANDLER: The HDP Handler manages all of the I/O operations between the NSP 80 and the LSP 300 and analyzes each operation for I/O errors. It coordinates with the HDP control (firmware) for proper routing of the I/O to the Line Support Processors 300. It receives and analyzes all the Result Descriptors from the LSP 300 and reports the status of all NSP-LSP I/O operations to the host computer 100.

REQUEST HANDLER: The Request Handler manages the Request message queue from the host computer 100 and services all Request messages (except for OUTPUT Request Messages). The OUTPUT Request Message is sent to an appropriate Editor component, if one is defined; it is then routed to the proper station destination. The Request Handler receives unqueued request messages from the Manager Component $80_m$.

STATUS HANDLER: The Status Handler is driven by the "HDP Handler". The primary function of this handler is to perform I/O operations for the HDP Handler. Specifically the Status Handler examines those I/O operations that are rejected by the Line Support Processor (LSP) and interrogates the LSP for the correct status of the Line Adapters involved. It uses this information to enable the HDP Handler to complete the original I/O operation.

S-PROCESSES: The S-Processes are collections of user defined code. The functions are dependent on the network configuration and the station types and the code is defined by the NDL program for a specific network. The code for an S-Process is individually loaded in the Executive $80_{ex}$ to perform specific tasks related to the network and is de-allocated when no longer required. The execution of each S-Process requires that the Interpreter be invoked. The Interpreter enables the code in the S-Process to be executed by the NDL state machine $50_b$. The editing and line control functions are typical examples of S-Processes. The scope of an S-Process can be understood by an understanding of the functions of the Editor and the Line Control Process.

INTERPRETER: An Interpreter is a "transient" Independent Runner. Unlike the Permanent Independent Runners, the transient Independent Runner is invoked for each S-Process that is activated and exists only as long as the S-Process exists. The Interpreter translates the code contained in the S-Process and provides an interface to the Operating System routines.

OPERATING SYSTEM: The Operating System Support is provided to the Network Support Processor in the form of two routines; these are:
 (a) Kernel routine
 (b) Secondary routine KERNEL ROUTINES: Kernel routines are a collection of routines or procedures, each of which performs a single Operating System Task. For example, to acquire space in the Shared Memory 90, a procedure called "GET-Space" is activated, and to release this space a procedure called "Forget-Space" is activated. Kernel routines are organized into seven levels or subgroups in order to increase the modularity of the design. The Kernel $80_k$ is resident in the fast RAM ($66_n$) portion of the NDL memory control card $66_b$.

SECONDARY ROUTINES: Secondary Routines are a collection of routines or procedures, each of which provide a common subsystem function. These are tasks such as: Clear-Adapter; Clear-Station; and Notify Line, are accomplished by procedures which belong to this group.

EDITOR: Editor is a user-provided and user-defined routing within the NDL program. It is used to manipulate the text portion of the Request Message and Result Message according to the requirements of specific terminal types in the Data Communications Network. The code for the Editor exists in the Shared Memory 90 as a collection of S-Processes. Thus the code is derived from the user-written NDL program for the network and is dependent on the network configuration. The NDL compiler insures the transformation of the Editor into a collection of S-Processes.

When specified by the NDL, the Editor receives control from the Executive component when a "Request Message" is sent by the host computer to a terminal. This enables the Editor to edit the text portion of the "Request Message". The edited message is subsequently passed on to the firmware Line Control Process $80_{lcp}$ to be sent to a terminal. A similar process occurs in the reverse direction, when a host input is received from the network. The Editor receives control from the Line Control Process and can edit the text of the host input "Result Message".

LINE CONTROL PROCESS: This firmware component $80_{lcp}$ is also user-provided and user-defined in the NDL program. The Line Control Process manages both a line and all the terminals connected to the subsystem through that line. It is responsible for implementing the line protocol, for handling error recovery, and other functions. The code for this component exists in the Shared Memory 90 of the NSP 80 as a collection of S-Processes. The S-Processes representing the Line Control Process originates from the user-written NDL program for the network and is dependent on the network configuration. The NDL compiler insures the transformation of the Line Control Process to a collection of S-Processes.

The Line Control Process in FIG. 16 is activated for each line added to the network and executes in the NSP 80 so long as the line remains attached to the network. It receives the OUTPUT Request Message from the Executive components or from the Editor components, if specified. In turn, it formats the INPUT "Result Message" and sends it to the Executive or Editor for delivery to the host computer 100.

The Line Control Process is primarily responsible for communication between the NSP 80 and the LSP 300. This communication uses messages called "SIGNAL" from the NSP to the LSP (FIG. 16) and messages called "Reply" from the LSP 300 to the NSP 80. While communications between the host computer and the NSP are entirely defined by NSP firmware, communication between the NSP and LSP 300 is defined by the user through the NDL program for the network.

A "SIGNAL" is a message created by the Line Control Process and sent to LSP 300. The Line Support Processor (LSP) 300 directs the signal to the proper destination within the network. A SIGNAL has two fields:
(a) Message text field
(b) Control information field The message text field consists of the text of the output request message from the host. The control information field consists of routing and other information for the LSP as defined by the NDL program.

A "Reply" is created by the NSP 300 and sent to the Line Control Process $80_{lcp}$ in the Network Support Processor 80. A "Reply" consists of two fields:
(a) Text field
(b) Control Information field The Text field consists of the actual text that has entered the network. The Control Information field, appended to the text field, is used by the Line Control Process $80_{lcp}$ to handle the text properly and to transmit the text to the host computer 100.

HOST COMPUTER TO NETWORK COMMUNICATION

A network message originates in the host computer 100. The message is sent across the MLI by means of a SEND message operation to the Network Support Processor 80 as a "Request". If an Editor is defined in the NDL program, the NSP can edit the text portion of the message. The edited message is then prepared for transmission to the LSP 300. Preparation is accomplished by re-formatting the message, under control of the Line Control Process firmware, into a SIGNAL. The SIGNAL is then passed to the Line Support Processor 300 across the MLI $100_m$ between the NSP 80 and the LSP 300. The Line Support Processor 300 receives the signal and directs it to the proper destination in the network.

NETWORK TO HOST COMPUTER COMMUNICATION

The Line Support Processor (LSP 300) receives the text from the network and formats it into a Reply message for transmission to the Network Support Processor (NSP 80). When the Network Support Processor receives the Reply message, it re-formats the text portion into an "input result message". The text portion is edited if an Editor is specified. The edited "input result message" is then ready for transmission into the host 100. In order for the host computer 100 to receive the "input result messages" from the NSP 80 across the MLI, a "GET message I/O Descriptor" must be issued by the host computer 100.

TRANSLATE TABLE: A translate table provides the mechanism to translate the EBCDIC character-set used by the data communication subsystem to the character-set used on a specific data communications line. These translate tables are required by the NDL program.

DATA COMMUNICATIONS NETWORK

The I/O Data Communications Network (IODC) subsystem can interface a maximum of 256 data communications lines per host computer. The maximum configuration is derived by interfacing (as seen in FIG. 1A) four Network Support Processors (NSP) per host computer, four Line Support Processors (LSP) per each Network Support Processor (NSP) and 16 electrical interfaces (line adapters) for each Line Support Processor (LSP). Burroughs Data Communication Protocol allows data communication devices to be connected in series or parallel so that each data communications line can service multiple (nominally as many as ten) devices. Theoretically it is possible to attach 2560 data communication devices to one host computer.

The limiting factor in interfacing devices is the throughput that can be accommodated and the software utilized. In the case of the IODC subsystem, the limiting factor is the Line Support Processor (LSP) bandpass. The LSP 300 can process approximately 50K bits per second. A Network Support Processor (NSP) can support 10 to 15 terminals, such as the TD 830, operating at 9600 bauds or any mix that represents an equivalent workload. The exact number of terminals that can be accommodated depends on the average terminal throughput. This, in turn, depends on such factors as the average message length, the type of data, (keyboard or canned) acceptable response time and so on.

The Line Support Processor 300 is a unit composed of several slide-in cards which can be fitted into a base module. This unit will consist of a card for a UIO-state machine processor, a set of cards called "Quad LA" which means four line adapters are built into that card, and an interface card designated MLI/LA which designates the line adapter interface to the message level interface bus.

The data communications Line Adapter is basically a device which interfaces on one end to a data communications line electrical interface and on the other hand to a state machine processor (UIO-SM). The line adapter's primary functions are to serialize bit information from/to byte information, to provide timing, to generate service requests, to provide a RAM memory storage, to provide auto-call interfacing and provide connection to level changers to match the data communications line.

The byte-oriented line adapter can be arranged into basic configurations; a Quad line adapter and a Single line adapter. The Single line adapter is part of the Line Support Processor 300, and shares the same circuit board with the MLI, and is always required regardless of the quantity of communication lines controlled by the Line Support Processor. The Quad line adapter card contains four line adapters on the one board. These boards are slide-in boards which plug into the base module backplane.

The Line Adapter cards are connected together by means of frontplane cables to the state machine processor (UIO-SM). Connection to the data communications line is through an electrical interface board which cables to the Line Adapter. There are different types of electrical interface boards that exist which may be cabled into different combinations on the Quad Line Adapters; thus, only the electrical interface board requires change depending on the data comm line electrical characteristics.

From one to 16 line adapters may be addressed by the state machine processor of the Line Support Processor. Each line adapter will be jumpered uniquely in order to identify its address.

Similar addressable components are contained on a line adapter which the state machine processor may communicate with in the form of write/read data or "status" or to provide control. Those addressable components in the line adapter are as follows: (a) USART; (b) Timer; (c) Auto-call output; (d) Auto-call Status; (e) component requestors; (f) memory.

The USART (Universal Synchronous/Asynchronous Receiver/Transmitter) accepts data bytes from the state machine processor and converts them into serial bits for transmission; it receives serial bit data and converts it to parallel data bytes. The device is initialized by writing into two control registers which specify the manner in which it operates. Various bits of the control registers specify such things as: (i) synchronous/asynchronous mode; (ii) bits per character; (iii) parity; (iv) Baud rate; (v) transparent mode; (vi) Echo mode.

Thus, the combination of line adapter cards, a state machine processor card and a line adapter interface card form the Line Support Processor which is connected to the network through the backplane of the base module and also the frontplane connectors.

The data communications line adapter used here is an application-dependent device which is controlled by the state machine processor of the LSP 300. There are two basic types of line adapters which are available: (a) character oriented and (b) bit oriented.

Each of these may have a variety of electrical interfaces to the data communications line.

One to 16 line adapters may be serviced by one LSP state machine processor. Each line adapter contains components which are addressable and can be serviced by the state machine processor with PUT or GET instructions. The components on the line adapter are serviced with one instruction or a series of instructions which, in some cases, provide sequential control for the components.

What is claimed is:

1. In a data communications network where a peripheral-controller controls data transfer operations between main memory of a main host computer and with a plurality of line communications processors connected to remote peripheral terminals, said peripheral-controller including master and slave processor means which include individual memory-controller means and a commonly shared memory bank, and an interface circuit which provides connection channels to said main host computer and said line communications processors, and wherein said master and slave processor means uses placement (PUT) and retrieval (GET) instructions to control operation of said interface circuit and to initiate the movement of data between said main host computer and said line communications processor after initiation instructions from said main host computer, the interface circuit for said peripheral-controller comprising:

(a) a first (DLI) interface logic means for controlling synchronous data transfers between said shared memory bank and said main memory of said host computer, said first interface logic means including:
(a1) PROM sequencing means, initiated by said master processor means, and functioning to operate a data shifting circuit for bidirectional movement of data words between said main host computer and said shared memory bank;
(a2) a data shifting circuit having connection means to said host computer and to said shared memory bank;

(b) a second (MLI) interface logic means for controlling asynchronous data transfers between said shared memory bank and a selected line communications processor, said second interface logic means including:

(b1) control logic means, operating under instructions from said master processor means, and functioning to transfer data between said shared memory bank and said selected line communications processor, wherein said control logic means operates to select the transfer of data in either
  (i) a direct memory access mode, or
  (ii) a non-direct memory access mode;

(b2) first channel means for transfer of each individual data word, during said non-direct memory access mode, between said shared memory bank and said selected line communications processor, by a single individual instruction from said master processor means to said control logic (b3) second channel means for transfer of blocks of data words, during said direct memory access mode, between said shared memory bank and said selected line communications processor by a single individual direct memory access instruction from said master processor means to said control logic means.

2. The interface circuit of claim 1, wherein said data shifting circuit, of said first interface logic (DLI) means, includes:

(a) first receiver-driver means for receiving/transmitting data words from/to said main host computer;

(b) second receiver-driver means for receiving/transmitting data words from/to said shared memory bank;

(c) register means for temporary storage of data words being transferred;

(d) counting means for counting the number of data words transferred, and including a signal line connected to said PROM sequencing means to provide information as to the number of words transferred.

3. The interface circuit of claim 2, wherein said PROM sequencing means includes:

(a) means to generate output control signals for the following units;
  (i) said master processor means;
  (ii) said main host computer;
  (iii) said first and second interface logic means;
  (iv) said selected line communications processor.

4. The interface circuit of claim 3, wherein said means to generate output control signals includes:

(a) a PROM memory means connected to provide its output to a PROM output register;

(b) a PROM output register providing output control signals for said interface circuit and next-address signals to said PROM memory means;

(c) a start address register for receiving a start address from said master processor means and functioning to initiate said PROM memory means.

5. The interface circuit of claim 3, wherein said PROM sequencing means further includes:

(a) next-address generation means for generating the next-address to be accessed in said PROM memory means.

6. The interface circuit of claim 1, wherein said first channel means of said second interface logic means includes:

(a) an I/O bus wherein said master processor means transfers data words from said shared memory bank to a data register;

(b) a data register for receiving data from said I/O bus for transfer to a transmitter driver;

(c) a transmitter-driver for transferring data words to a bidirectional data bus;

(d) a bidirectional data bus for moving data words to/from a selected line communications processor.

7. The interface circuit of claim 6, wherein said first channel means further includes:

(a) receiver means connected to said bidirectional data bus for receiving data words from a selected line communications processor and for transfer to said I/O bus for placement in said shared memory bank.

8. The interface circuit of claim 1, wherein said second channel means of said second (MLI) interface logic means includes:

(a) shared memory output bus means connecting said shared memory bank to a direct memory access driver;

(b) a bidirectional data bus connecting said selected line communications processor to said direct memory access driver, said data bus operating under control of said control logic means to transfer blocks of data from said shared memory bank to said selected line communications processor.

9. The interface circuit of claim 8, wherein said second channel means further includes:

(a) receiver means connected to said selected line communications processor via said bidirectional data bus for transferring blocks of data, during direct memory access operations, from said selected line communications processor to an I/O bus for transfer to said shared memory bank;

(b) an I/O bus connecting said receiver means to said shared memory bank via said master processor means.

10. The interface circuit of claim 8, wherein said second channel means includes:

(a) direct memory address means for addressing said shared memory bank during direct memory access operations.

* * * * *

UNITED STATES PATENT AND TRADEMARK OFFICE
CERTIFICATE OF CORRECTION

PATENT NO. : 4,443,850                        Page 1 of 2

DATED : April 17, 1984

INVENTOR(S) : Craig W. Harris

It is certified that error appears in the above-identified patent and that said Letters Patent is hereby corrected as shown below:

```
Col.  7, line 22, change "(maste" to --(master--.
Col.  9, line 39, after "machine" insert --50a--.
Col. 12, line  6, change "controls," to --controls.--;
                  delete "FIGS. 8, 9, 9A, 10 and 10A.";
         line  7, after "summary" insert --, FIGS. 8, 9, 9A,
                  10 and 10A,--;
                  delete "of FIG. 8,"
         line  8, delete "section";
         line 55, change "ator" to --ators--.
Col. 13, line 48, change "105;" to --105i.--.
Col. 15, line 24, change "pointers)" to --pointer)--.
Col. 17, line 12, after "state" insert --machine when an
                  interface generated DLP service--.
Col. 21, line 11, change "then" to --When--.
Col. 22, line  6, change "the", first occurrence, to
                  --that--;
         line 23, change "had" to --has--.
Col. 25, line 17, change "100;" to --100i--;
         line 34, change "of" to --to--.
Col. 27, line 36, change "mon-DMA" to --non-DMA--.
Col. 28, line 28, after "and" insert --slave--;
                  delete "50b50a,";
         line 29, delete "(50a, 50b)".
Col. 29, line 37, change "41;" to --41',--.
Col. 30, line 30, change "cards," to --cards--.
```

UNITED STATES PATENT AND TRADEMARK OFFICE
CERTIFICATE OF CORRECTION

PATENT NO. : 4,443,850

DATED : April 17, 1984

INVENTOR(S) : Craig W. Harris

Page 2 of 2

It is certified that error appears in the above-identified patent and that said Letters Patent is hereby corrected as shown below:

Col. 31, line 13, delete "unit";
change "processor" to --unit--.
Col. 34, line 8, change "41" to --41'--.
Col. 43, line 18, change "routing" to --routine--.
Col. 47, line 18, after "logic" insert --means;--.

Signed and Sealed this

Twentieth Day of November 1984

[SEAL]

Attest:

GERALD J. MOSSINGHOFF

Attesting Officer

Commissioner of Patents and Trademarks